(12) United States Patent
Sharma et al.

(10) Patent No.: US 8,239,477 B2
(45) Date of Patent: Aug. 7, 2012

(54) APPARATUS AND METHODS FOR CONTROLLING A DATA TAPPING SESSION IN A STORAGE AREA NETWORK

(75) Inventors: Samar Sharma, San Jose, CA (US); Roy M. D'Cruz, Sunnyvale, CA (US); Jhaanaki M. Krishnan, San Jose, CA (US); Prashant Billore, San Jose, CA (US); Dinesh G. Dutt, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 1646 days.

(21) Appl. No.: 11/356,914

(22) Filed: Feb. 16, 2006

(65) Prior Publication Data

US 2007/0192526 A1    Aug. 16, 2007

Related U.S. Application Data

(63) Continuation-in-part of application No. 11/177,880, filed on Jul. 8, 2005, now Pat. No. 7,356,573.

(51) Int. Cl.
  *G06F 15/167*   (2006.01)
  *G06F 3/00*   (2006.01)
  *G06F 7/00*   (2006.01)

(52) U.S. Cl. ............ 709/212; 710/1; 707/659

(58) Field of Classification Search ........... 709/212
  See application file for complete search history.

(56) References Cited

U.S. PATENT DOCUMENTS

| | | | |
|---|---|---|---|
| 6,182,197 B1 | 1/2001 | Dias et al. | |
| 6,633,904 B1 * | 10/2003 | Shinkai | ........ 709/213 |
| 6,681,310 B1 | 1/2004 | Kusters et al. | |
| 6,735,636 B1 | 5/2004 | Mokryn et al. | |
| 7,003,780 B2 | 2/2006 | Peloquin et al. | |
| 7,020,760 B2 * | 3/2006 | Glider | ........ 711/202 |

(Continued)

OTHER PUBLICATIONS

Written Opinion and International Search Report dated Jul. 15, 2008 for related application PCT/US07/62035.

(Continued)

*Primary Examiner* — Kenny Lin
*Assistant Examiner* — Guang Li
(74) *Attorney, Agent, or Firm* — Weaver Austin Villeneuve & Sampson LLP

(57) ABSTRACT

Disclosed is a session modification mechanism for altering a data tapping process in a storage area network (SAN). In general, a data tapping mechanism is set up so that an appliance receives SAN data that is tapped from a particular SAN session. That is, the data tapping mechanism provides to a particular appliance a copy of the SAN data that is being written from a particular host to a particular storage device. The session modification mechanism allows the appliance to alter various aspects of the SAN session that is to be (or is being) tapped. Examples of various modification features includes (i) redirecting READ commands initiated by the host to the appliance and not sending such command to the storage device, (ii) redirecting both READ and WRITE commands initiated by the host to the appliance and not sending such commands to the storage device, (iii) halting redirection and thereby causing READ commands initiated by the host to be sent to the storage device and WRITE commands initiated by the host to be mirrored to both the storage device and appliance, (iv) quiescing and unquiescing all data I/O's for the particular storage device and appliance, and (v) stopping and starting the data tapping mechanism.

20 Claims, 13 Drawing Sheets

U.S. PATENT DOCUMENTS

| | | | |
|---|---|---|---|
| 7,072,894 B2 | 7/2006 | Loy et al. | |
| 7,089,384 B2 * | 8/2006 | Tross et al. | 711/162 |
| 7,275,138 B2 * | 9/2007 | Saika | 711/154 |
| 7,318,133 B2 | 1/2008 | Yagawa et al. | |
| 7,356,573 B2 | 4/2008 | Sharma et al. | |
| 7,506,124 B2 * | 3/2009 | Sharma et al. | 711/165 |
| 7,684,417 B2 * | 3/2010 | Imai et al. | 370/401 |
| 7,849,265 B2 * | 12/2010 | Hara et al. | 711/114 |
| 7,890,645 B2 * | 2/2011 | Nagai et al. | 709/229 |
| 7,908,449 B2 * | 3/2011 | Satoyama et al. | 711/163 |
| 2001/0037371 A1 | 11/2001 | Ohran | |
| 2002/0191649 A1* | 12/2002 | Woodring | 370/906 |
| 2004/0128456 A1 | 7/2004 | Kobayashi et al. | |
| 2004/0139237 A1 | 7/2004 | Rangan et al. | |
| 2004/0143639 A1* | 7/2004 | Rangan et al. | 709/212 |
| 2004/0210677 A1* | 10/2004 | Ravindran et al. | 710/1 |
| 2005/0157730 A1 | 7/2005 | Grant et al. | |
| 2005/0256972 A1 | 11/2005 | Cochran et al. | |
| 2006/0013222 A1 | 1/2006 | Rangan et al. | |
| 2006/0015645 A1 | 1/2006 | Ocko et al. | |
| 2006/0047675 A1* | 3/2006 | Lowe et al. | 707/101 |
| 2006/0080416 A1 | 4/2006 | Gandhi | |
| 2007/0073783 A1* | 3/2007 | Honami et al. | 707/200 |
| 2007/0112872 A1* | 5/2007 | Saito | 707/200 |
| 2007/0140236 A1 | 6/2007 | Parthasarathy et al. | |

OTHER PUBLICATIONS

EMC2 and Fujitsu Siemens Computers, Global Recovery Demonstration: SRDF/A and PRIMCLUSTER-EMC Remote Data Facility/Asynchronous Fujitsu Siemens Computers PRIMCLUSTER, Feb. 2004, pp. 1-26.

EMC2, EMC SRDF Family, Powerful remote replication solutions improve organizational productivity, enhance online business continuity, 2004, pp. 1-11.

Office Action dated Jun. 27, 2007 for U.S. Appl. No. 11/177,800.

Notice of Allowance dated Nov. 23, 2007 for U.S. Appl. No. 11/177,800.

Office Action dated Jan. 25, 2008 for U.S. Appl. No. 11/361,119.

Notice of Allowance dated Jul. 30, 2008 for U.S. Appl. No. 11/361,119.

International Search Report and Written Opinion dated Sep. 13, 2007 for PCT Application No. PCT/US06/26640.

Office Action dated Nov. 20, 2009 for Chinese Patent App. No. 200680021721.4.

Extended European Search Report dated Nov. 18, 2010 for European Patent Application No. 07797132.3.

Cisco: "A Closer Look at SANTap an Open Protocol for Appliance Based Storage Applications", Storage Networking World Europe Conference, Jun. 2005, XP002605313.

Cisco Systems: "Cisco MDS 9000 Family SANTap Service—Enabling Intelligent Fabric Applications", Technology Overview 2005, XP002605314.

European Search Report dated May 18, 2011 for European Patent Application No. 06786704.4.

Cisco: "Cisco SANTap Overview", MDS 9000 Family SANTap Deployment Guide, May 1, 2009, pp. 1-8, XP55000012.

Baker B. Foster C. Sharp Cisco Systems F: "Cisco Architecture for Lawful Intercept in IP Networks; rfc3924.txt", IETF Standard, Internet Engineering Task Force, IETF, Oct. 1, 2004, pp. 2-9, XP015009697.

* cited by examiner (Normal and RD_Only Redirect Mode)

(Normal Mode)

(RD_Only Redirect Mode)

(RD_And_WR Redirect Mode)

APPARATUS AND METHODS FOR CONTROLLING A DATA TAPPING SESSION IN A STORAGE AREA NETWORK

CROSS REFERENCE TO RELATED PATENT APPLICATION

This application is a continuation-in-part of and claims priority of U.S. patent application Ser. No. 11/177,880, entitled "APPARATUS AND METHODS FOR DATA TAPPING IN A STORAGE AREA NETWORK", filed Jul. 8, 2005 now U.S. Pat. No. 7,356,573 by Sharma et al., which application is incorporated herein by reference in its entirety for all purposes.

BACKGROUND OF THE INVENTION

The present invention relates to storage area networks. More particularly, the present invention relates to methods and apparatus for facilitating intelligent services with respect to data flowing between a host and a storage device, or the like.

In recent years, the capacity of storage devices has not increased as fast as the demand for storage. Additionally, a host may wish to use multiple storage devices because it needs tiered and heterogeneous storage or because storage management facilities are needed for reasons specific to the storage environment. For example, it may be desirable to use database tables on a fast storage device, and other tables on a slower or less expensive storage device.

In order to solve these storage limitations, the storage area network (SAN) was developed. Generally, a storage area network is a high-speed special-purpose network that interconnects different data storage devices and associated data hosts on behalf of a larger network of users.

Recently, mechanisms for tapping data flows within a SAN have been provided so as to facilitate applications that could use such tapped data, such as continuous backup, traffic analysis, or remote replication applications. Several embodiments of a data tapping system are further described in co-pending U.S. patent application Ser. No. 11/177,880, filed 8 Jul. 2005 by Samar Sharma et al., which application is incorporated herein by reference in its entirety for all purposes. In general, mechanisms are provided in a SAN to tap data flowing between a host and a storage device. In one implementation, data sent by a specific host to a specific storage device is intercepted. The intercepted data or a copy of such data is then sent to both the specific storage device and to an appliance.

Although the basic data tapping scheme advantageously provides a new and useful service with respect to a SAN, there are continuing efforts to provide improvements of such a data tapping scheme.

SUMMARY OF THE INVENTION

The present invention provides a session modification mechanism for altering a data tapping process in a storage area network (SAN). In general, a data tapping mechanism is set up so that an appliance receives SAN data that is tapped from a particular SAN session. That is, the data tapping mechanism provides to a particular appliance a copy of the SAN data that is being written from a particular host to a particular storage device. The session modification mechanism allows the appliance to alter various aspects of the SAN session that is to be (or is being) tapped. Examples of various modification features includes (i) redirecting READ commands initiated by the host to the appliance and not sending such command to the storage device, (ii) redirecting both READ and WRITE commands initiated by the host to the appliance and not sending such commands to the storage device, (iii) halting redirection and thereby causing READ commands initiated by the host to be sent to the storage device and WRITE commands initiated by the host to be mirrored to both the storage device and appliance, (iv) quiescing and unquiescing all data I/O's for the particular storage device and appliance, and (v) stopping and starting the data tapping mechanism.

In one embodiment, a method of modifying a data tapping process in a storage area network (SAN) is disclosed. A data tapping mechanism is provided for an appliance to receive SAN data that is being sent from a host to a storage device. A request to modify operation of the data tapping mechanism is received, and the data tapping mechanism based on the request.

In a specific implementation, the request is a Read Only Redirect Request and the data tapping mechanism is modified so as to redirect a READ command to the appliance when the host is sending a READ command to the storage device so that the READ command is not sent to the storage device. In another implementation, the request is a READ and WRITE Redirect Request and the data tapping mechanism is modified so as to redirect a READ command to the appliance when the host is sending the READ command to the storage device so that the READ command is not sent to the storage device and for redirecting a WRITE command to the appliance when the host is sending the WRITE command to the storage device so that the WRITE command is not sent to the storage device. In another aspect, the request is an Undo Redirect Request and the data tapping mechanism is modified so as to resume sending a READ command to the storage device when the host is sending the READ command to the storage device and mirror a WRITE command to both the storage device and appliance when the host is sending the WRITE command to the storage device.

In yet another embodiment, the request is a Quiesce Request and the data tapping mechanism is modified so as to suspend the SAN data from being sent to the appliance and the storage device, as well as any subsequent handshaking data from being sent between the host and the target/storage device. In a further aspect, an Unquiesce Request is received. The data tapping mechanism is modified so as to resume the sending of the SAN data to the appliance and the storage device, as well as resuming any subsequent handshaking data.

In another embodiment, the request is a Stop Request and the data tapping mechanism is modified so as to stop the SAN data from being sent to the appliance. In a further implementation, a Start Request is received, and the data tapping mechanism is modified so as to start the sending of the SAN data to the appliance. In a further aspect, any WRITE data sent by the host to the storage device are logged as WRITE errors for the appliance. The logged WRITE errors are then sent to the appliance when the appliance requests such WRITE errors.

In another embodiment, the invention pertains to an apparatus operable to modify a data tapping process in a storage area network (SAN). The apparatus includes one or more processors and one or more memory. At least one of the memory and processors are adapted to provide at least some of the above described method operations.

In an alternative embodiment, the invention pertains to a system for modifying a data tapping process in a storage area network (SAN). The system includes a host, a storage device for storing data, an appliance for tapping data in the SAN, and a network device in the SAN. The network device is operable to provide a data tapping mechanism for an appliance to receive SAN data that is being sent from a host to a storage device; receive a request to modify operation of the data tapping mechanism; and modify the data tapping mechanism based on the request.

These and other features and advantages of the present invention will be presented in more detail in the following specification of the invention and the accompanying figures which illustrate by way of example the principles of the invention.

DETAILED DESCRIPTION OF SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1:
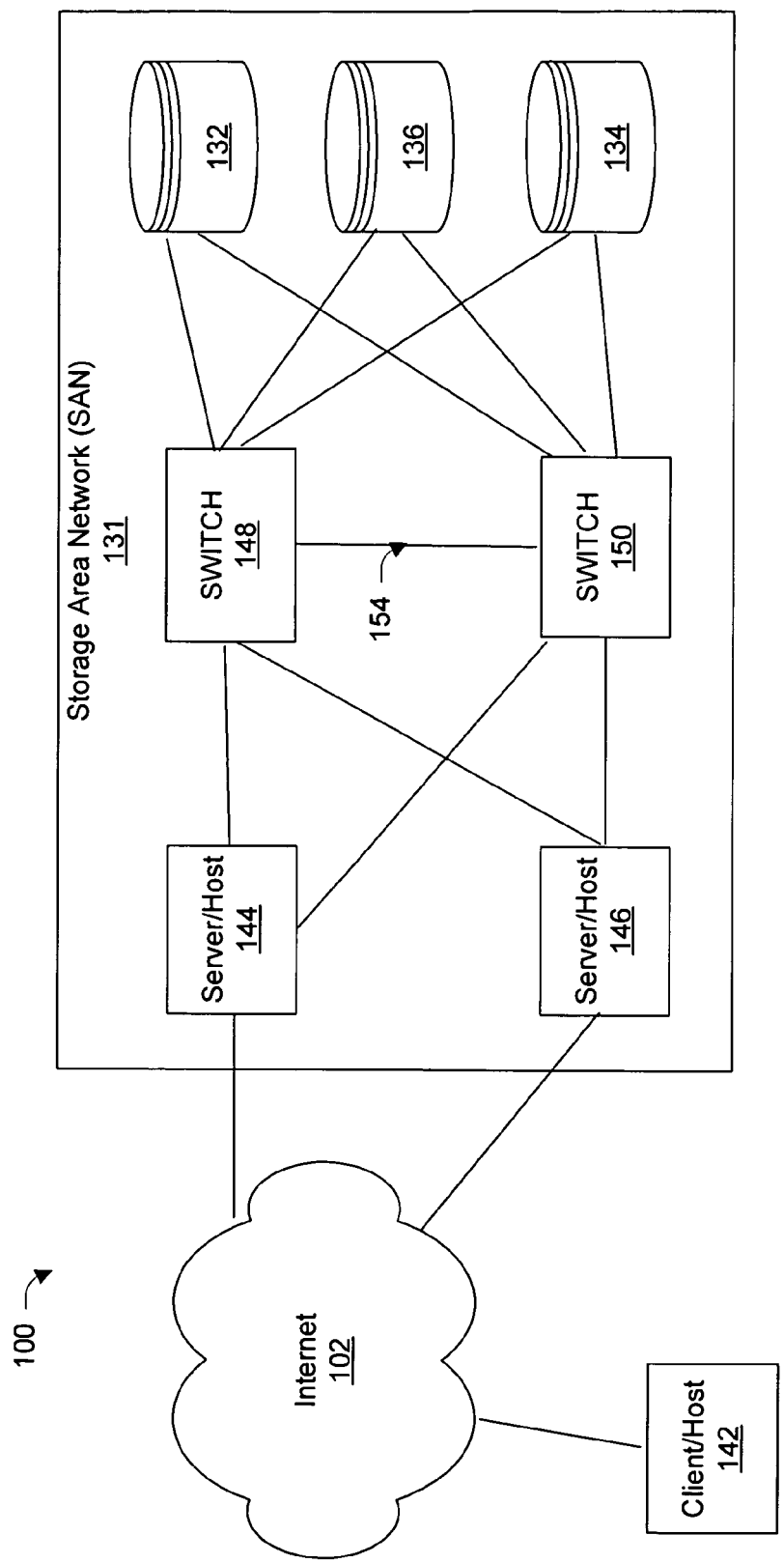
FIG. 1 is a block diagram illustrating an exemplary storage area network in which various embodiments of the invention may be implemented.

FIG. 1 is a block diagram illustrating an exemplary network 100 in which various embodiments of the invention may be implemented. As shown, network 100 includes a storage area network (SAN) 131, such as a bank's financial data center, for handling requests for data as initiated by any suitable type of entity, such as a customer's host or client computer 142. Of course, a plurality of hosts/clients (not shown) typically would be able to access such a SAN 131. In current networks, the client 142 typically sends requests to SAN 131 via a wide area network, such as the Internet 102. The SAN 131 may also implement virtualization, and such a network may be referred to as a virtual storage area network (VSAN). Virtualization generally refers to the use of software entities to represent one or more physical entities. For example, a virtual port (e.g., of a switch) may represent two physical ports (e.g., of the switch). However, so as to simplify this initial description, only a SAN without virtualization will be described although embodiments of the present invention include at least some virtualized entities in the SAN.

In a SAN, data may be read from, as well as written to, various portions of a plurality of storage devices (e.g., 132, 134, and 136) within SAN 131 in response to commands sent by client 142 to one or more servers or hosts, e.g., 144 and 146, of SAN 131. In general, the data may be accessed by any number of hosts or clients although not illustrated in FIG. 1. Communication among the storage devices and hosts is accomplished by coupling the storage devices and hosts together via one or more switches, routers, or other network nodes configured to perform switching functions. In this example, switches 148 and 150 may also communicate with one another via an interswitch link 154.

Although the network devices described above with reference to FIG. 1 are described as switches, the present invention may be practiced with respect to any suitable type of network device. Thus, other network devices such as routers may be implemented to receive, process, modify and/or generate packets or frames with functionality such as that described herein for transmission in a storage area network. Moreover, the network devices described herein are merely illustrative, and therefore other configurations of a network device may be utilized to implement the disclosed inventive embodiments.

In some of the discussion herein, the functions of switches of this invention are described in terms of the SCSI protocol. This is because many storage area networks in commerce run a SCSI protocol to access storage sites. However, the present invention may be implemented using any suitable device connectivity protocol, besides SCSI. Currently, storage area networks also employ the Fibre Channel (FC) protocol (FC-PH (ANSI X3.230-1994, Fibre Channel—Physical and Signaling Interface) as a lower level protocol and runs IP (Internet Protocol) and SCSI on top of Fibre Channel. Note that the invention is not limited to any of these protocols and may be applied to any protocol, such as FC, iSCSI, FCIP, iFCP, Eternet, FV, etc. The implemented protocols may also include any permutation of SCSI, such as SCSI over FC, iSCSI (SCSI over IP), parallel SCSI (SCSI over a parallel cable), serial SCSI (SCSI over serial cable, and all the other incarnations of SCSI.

Because SCSI is so widely used in storage area networks, much of the terminology used herein will be SCSI terminology. The use of SCSI terminology (e.g., "initiator" and "target") does not imply that the described procedure or apparatus must employ SCSI. Before going further, it is worth explaining a few of the SCSI terms that will be used in this discussion. First an "initiator" is a device (usually a host system) that requests an operation to be performed by another device. Typically, in the context of this document, a host initiator will request a read or write operation be performed on a region of virtual or physical memory. Next, a "target" is a virtual or physical device that performs an operation requested by an initiator. For example, a target physical or virtual memory disk will obtain or write data as initially requested by a host initiator. Note that while the host initiator may provide instructions to READ from or WRITE to a "virtual" target having a virtual address, a fabric switch (or some other mechanism) first converts those instructions to a physical target address before instructing the target.

Figure 2:
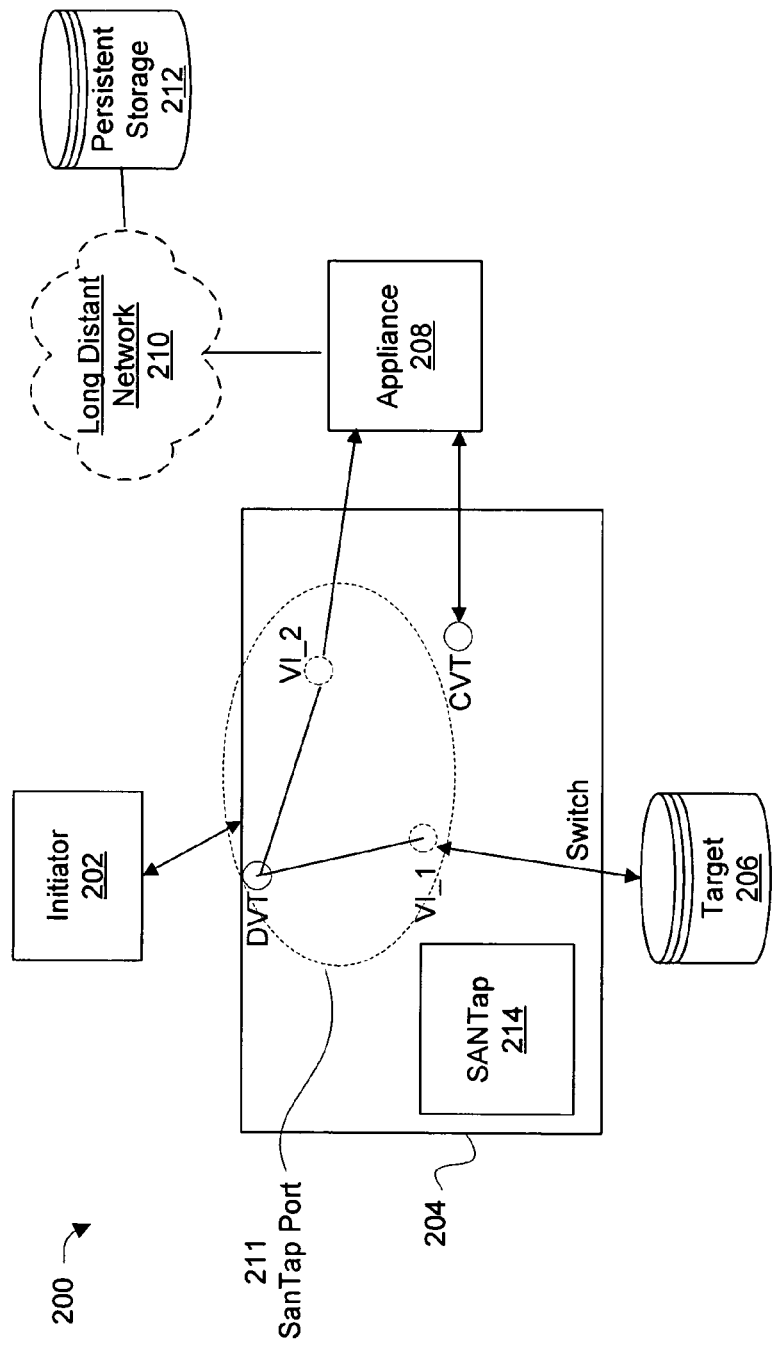
FIG. 2 is a diagrammatic representation of a network segment that includes an appliance for tapping and modifying one or more SAN or VSAN data sessions or flows between an initiator and a target in accordance with one embodiment of the present invention.

FIG. 2 is a diagrammatic representation of a network segment 200 that includes an appliance 208 for tapping one or more SAN or VSAN data sessions or flows between an initiator 202 and a target 206 in accordance with one embodiment of the present invention. Of course, any number of appliances may tap data from one or more sessions between any number of initiator and target pairs. As shown, the initiator 202 accesses (e.g., READ or WRITE) target 206 via switch 204. Typically, a pair of redundant switches (not shown) are used in the event of failure of a one of the switches. Also, SCSI targets, such as storage disks or physical logic units (PLUNs), are directly accessible by SCSI initiators (e.g., hosts). Similarly, even when VLUNs (virtual logical units) are implemented, the VLUNs are visible and accessible to the SCSI initiators. Thus, each initiator will typically identify those PLUNs or VLUNs that are available to it. More specifically, the initiator typically determines which SCSI target ports are available to it. The initiator may then ask each of those SCSI target ports which PLUNs or VLUNs are available via those SCSI target ports. The procedures for an initiator to identify the target ports and LUNs available to it generally include various handshaking procedures for querying the switch and ports for such information.

As shown, appliance 208 is coupled to switch 204, and such switch 204 is configured or set up to allow the appliance access to data flowing between initiator 202 and target 206. Appliances generally may be configured to store SAN or VSAN data in persistent memory (e.g., 212) for various applications without disrupting the flow in the SAN or VSAN. In one application, data written from the initiator to the target is replicated on a remote site by the appliance. For example, appliance 208 replicates data being sent from initiator 202 to target 206 and this replicated data is sent to a remote persistent storage 212 via an optional long distance network 210. In another application, data I/O between an initiator and target is tracked for each increment of time so that logs of I/O for discrete periods of time are retained for later use. This retained data I/O can then be retrieved for a particular time period, for example, to recover data that was lost for such period of time. The retrieved data may also be analyzed over specific periods of time for various purposes.

Such a SAN data tapping scheme is referred to herein as "SANTap" 214. Generally, SANTap is operable to allow an appliance to tap into the SAN or VSAN data flow for various applications. In other words, embodiments of SANTap serve as enablers of appliance applications that require copies of SAN or VSAN data. Any suitable mechanism may be used to allow an appliance to tap the data I/O between an initiator and target.

In one implementation, a software entity for handling a SANTap is configured or set up in the switch. This software entity may include one or more data virtual target (DVT) and virtual initiator (VI) pairs. In one implementation, the appliance causes one or more DVT and VI pairs to be set up in a switch as needed. Several mechanisms for forming and handling virtual targets and virtual initiators are described further in "Cisco MDS 9000 Family Configuration Guide, Cisco MDS SAN-OS Release 1.1(1a)", Cisco Systems, Inc., January 2004, http://www.cisco.com and co-pending U.S. patent application Ser. No. 10/056,238, entitled METHODS AND APPARATUS FOR IMPLEMENTING VIRTUALIZATION OF STORAGE WITHIN A STORAGE AREA NETWORK, filed 23 Jan. 2002 by Thomas James Edsall et al. This document and patent application are incorporated herein by reference in their entirety for all purposes.

As shown in the example implementation of FIG. 2, a DVT is set up between initiator 202 and target 206. The target and/or initiator may be virtual or real, physical devices. The DVT is configured to intercept data I/O sent from the initiator 202 to the target 206. The intercepted data is then mirrored from one or two virtual initiator (VI) entities, e.g., VI_1 and VI_2 in the illustrated example. Entity VI_1 routes this data I/O to the destination or real target 206, and VI_2 routes this data I/O to associated appliance 208. This set of virtual entities (DVT, VI_1, and VI_2) may be referred to as a SANTap port 211. Several DVT and VI arrangements are further described below. This SANTap port is just one example of an entity for performing such operations and is not meant to limit the scope of the invention to a specific DVT and VI configuration.

A SANTap port may be configured using any suitable mechanism and/or configured by any suitable entity. Preferably, each appliance is operable to configure a DVT in an appropriate switch as needed for its particular application. In a specific implementation, an appliance causes the switch to set up a DVT by sending a "create" command to the switch. As shown, a control virtual target (CVT) is first set up in the switch for receiving commands from the appliance 208. The appliance 208 specifies to the switch through such CVT various aspects of a specific SANTap. The appliance may also specify various other commands for affecting the data tap via its CVT. By way of example, the appliance may issue commands via its CVT to set up a DVT in the switch for a particular initiator and target session, initiate data copying from such session, cease data copying for such session, quiesce, unquiesce, special behaviors, etc. In the illustrated embodiment, appliance 208 specifies through CVT that DVT is to be created so as to tap data flowing between initiator 202 and target 206. Appliance 208 may also stop the data tap through such DVT.

In one embodiment, a session is identified by a specific associated initiator, target, and LUN (or logical units of the target that are accessible by the specific initiator). This set of information uniquely identifies a particular session or flow. In general, each DVT and VI pair created in a switch is configured to direct data from a specific flow to a specific appliance data target (ADT), which may be set up as a virtual target on the appliance side for receiving data (not shown). In one implementation, the initiator or host sets up a session between itself and a specific target and LUN. A copy is made of data received by the relevant DVT that was set up for such session. In the data copy frame, the FCID and LUN of the real target is replaced with the FCID and LUN that is associated with the appliance.

When the appliance is delivering applications like long distance replication, continuous data protection, snapshots, data migration, etc., there are challenges with respect to keeping the host application undisturbed and yet achieving replication. Some examples issues are:

When the host application is running, what if the real target disk/array were to go down?

When the host application is running, what if there is congestion in the appliance or the appliance has to be replaced or there is an any other kind of appliance failure?

How to gracefully bring back the real target disk/array to an "up" state without affecting the host application?

How to gracefully bring back the appliance to the up state without affecting the host application?

How to help the appliance read the various journals/logs maintained by the switch without affecting the host application?

How to modify several replication parameters without affecting host application?

In several embodiments of the invention, SANTap provides several ways to manage these situations. These mechanisms provided by SANTap ensure that the host application is undisturbed. Additionally, each such situation can be handled effectively with no I/O correctness issues, and efficiently with minimal logic being added on the appliance side. These session management mechanisms can also be provided economically without increasing time for recovery.

SANTap may include any suitable session modification features. For example, SANTap may allow an appliance to redirect READ and/or WRITE commands from the target to the appliance. A normal SANTap procedure may direct READ commands only to the target and direct WRITE commands to both the target and appliance. The appliance may then request that this normal I/O handling be modified to redirect the I/O's in various modes. For a READ only redirection mode, READ commands are then only sent to the appliance and not the target. In a READ and WRITE redirection mode, both READ and WRITE commands are redirected only to the appliance and not the target. Several example applications for these different SANTap Redirection schemes are further described below. Another SANTap session modification scheme may allow an appliance to quiesce or unquiesce all the data I/O's of a SANTap session. That is, SANTap handling of the data is suspended temporarily. In other examples, the SANTap session may be stopped and restarted as needed by the appliance.

Figure 3:
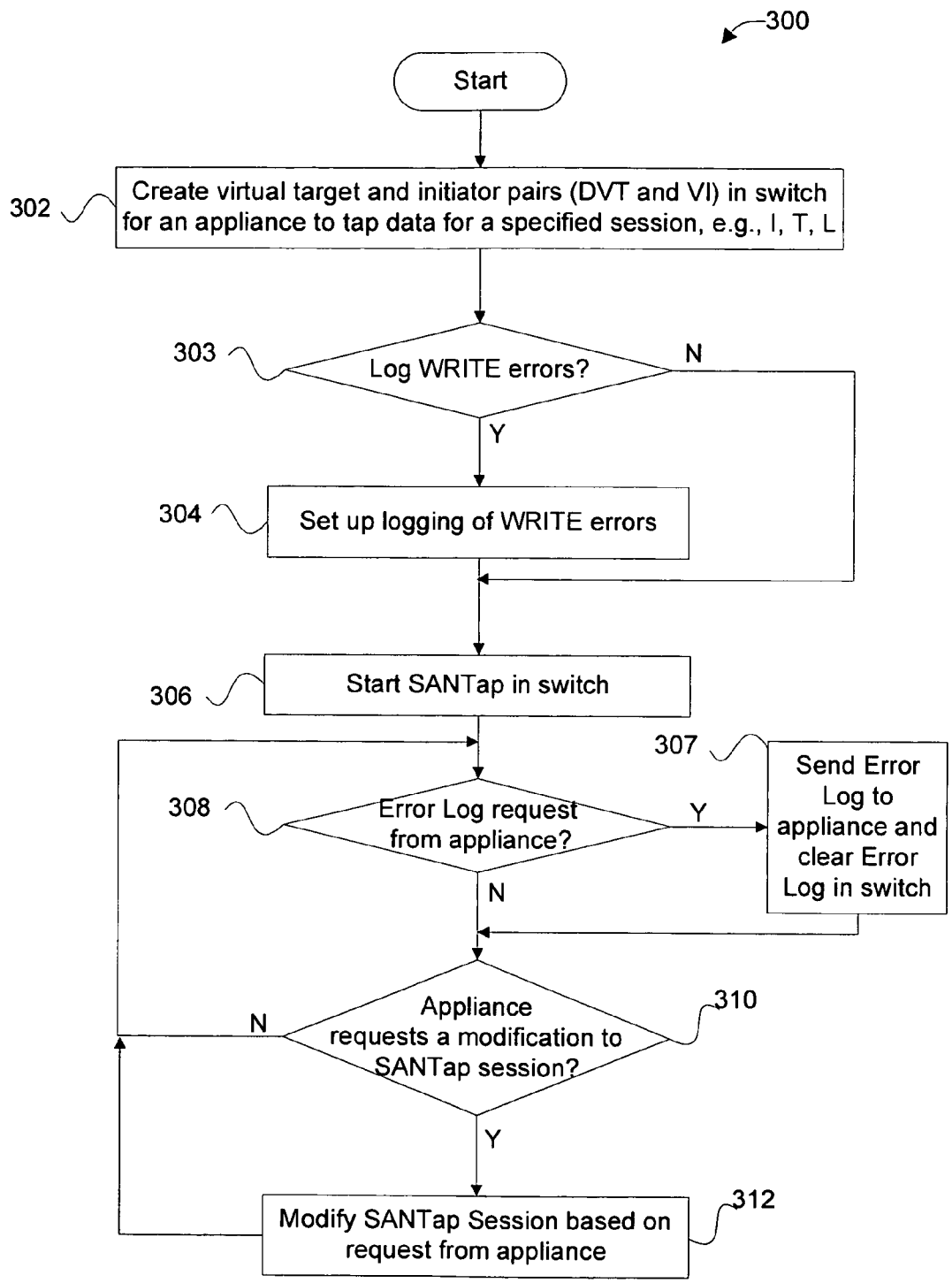
FIG. 3 is a flowchart illustrating a procedure for modifying a SANTap session in accordance with one implementation of the present invention.

Any suitable techniques may be utilized for an appliance to set up and/or modify a SANTap session. FIG. 3 is a flowchart illustrating a procedure 300 for modifying a SANTap session in accordance with one implementation of the present invention. The following procedure illustrates set up and modification of the SANTap process for a particular session; however, the same general procedure may be practiced for any number of sessions. That is, a first session is modified in a first manner, while a second session is modified in a second manner. Also, the following procedure is described in relation to a single appliance modifying a particular session. However, this procedure can be practiced for any number of appliances which are modifying a SANTap session for the same or different target and initiator pairs.

Referring to FIG. 3, one or more virtual target and initiator pairs (DVT and VI) may be initially created in each switch for an appliance to tap data for a specified session, e.g., I (initiator), T (target), L (LUN), in operation 302. Several embodiments for setting up a data tap are described further below. It may then optionally be determined whether to log WRITE errors in operation 303. For example, an appliance may send an explicit request to initiate a process for logging of WRTIE errors when an error occurs during a particular SANTap session. Alternatively, WRITE errors may be logged automatically for all SANTap session errors without being selected by a request. In the illustrated example, if WRITE errors are to be logged, a process for logging any WRITE errors is then started in operation 304. Otherwise, this operation for logging WRITE errors is skipped. For instance, a flag for logging WRITE errors may be set so as to activate or deactivate a error logging process during a particular SANTap session.

Figure 5A:
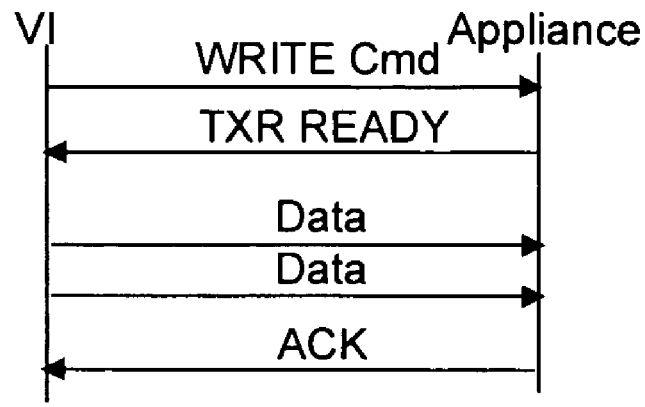
FIG. 5A is a communication diagram illustrating a handshaking process for writing data between a virtual initiator (VI) and an appliance.

In one mode of SANTap operation, each data WRITE command issued from a particular host initiator and target includes a handshaking protocol for mirroring such data to the appliance, as well as the real target. FIG. 5A is a communication diagram illustrating a general WRITE handshaking process for writing data between a VI and an appliance. Only a rough sketch of the basic types of message and data that are sent between the VI and appliance are illustrated here so as to simplify the description of the invention. Of course, the handshaking protocol for a data WRITE may include any number and type of messages and data. As shown, a WRITE command is initially sent from the VI to the appliance. After a TXR READY response is received back from the appliance, one or more data blocks may be written from the VI (or host initiator) to the appliance. After the data WRITE's complete, the appliance sends an acknowledgement (ACK) that it received all of the data. A failure in data WRITE handshaking process is logged. For example, if the appliance fails to acknowledge the three different data WRITE sessions, each particular failed WRITE session is logged.

Figure 5B:
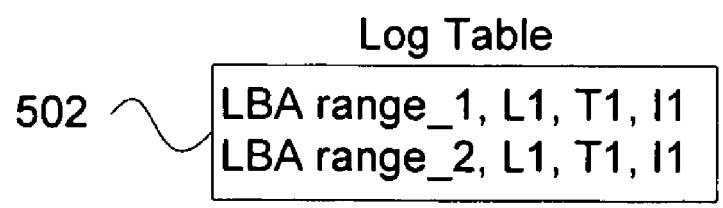
FIG. 5B illustrates an Error Log Table in accordance with one implementation of the present invention.

FIG. 5B illustrates an Error Log Table in accordance with one implementation of the present invention. An Error Log Table may be maintained separately for each session or a single Error Log Table may be maintained for all sessions (as illustrated). In the example of FIG. 5 an entry is added to the Log for each failed data WRITE. Each entry specifies at least the LBA_range, LUN, target, and host initiator for the failed data WRITE. Of course, READ errors to the storage device (or appliance) and/or WRITE errors to the storage device can be logged in alternative embodiments.

SANTap may then be started (or continued) in the switch in operation 306. During SANTap for a particular session, errors in the WRITE's to the appliance can be retained in the Error Log. It may then be determined whether a Error Log request has been received from an appliance in operation 308. If a log request has been received, the Error Log is then sent to the appliance and the Error Log is cleared in this switch in operation 307. Otherwise, this operation is skipped. After the Error Log is sent to the appliance, it may be assumed that the appliance is aware of the error and managing the errors and the Error Log can then be cleared so as to log errors of which the appliance is not aware. Several embodiments for handling WRITE errors are described in concurrently filed U.S. application Ser. No. 11/356,857, entitled APPARATUS AND METHODS FOR AN APPLIANCE TO SYNCHRONIZE WITH A STORAGE DEVICE, by Samar Sharma et al., which application is incorporated herein by reference in its entirety for all purposes.

It may then be determined whether the appliance has requested a modification to the SANTap session in operation 310. In one implementation, the appliance can modify the SANTap session by sending a RD_ONLY redirect request, a RD_AND_WR redirect request, an UNDO redirect request, a QUIESCE request, an UNQUIESCE request, a STOP request, or a START request, wherein each request specifies a particular session or DVT. An appliance may send any of these requests (e.g., via its CVT) for modification of a particular SANTap session. If no session modification request has been received, the procedure 300 repeats. If a session request modification is received, the SANTap session is then modified based on the request from the appliance in operation 312. The procedure then jumps to operation 308 and it is determined again whether an Error Log request has been received.

Figure 4A:
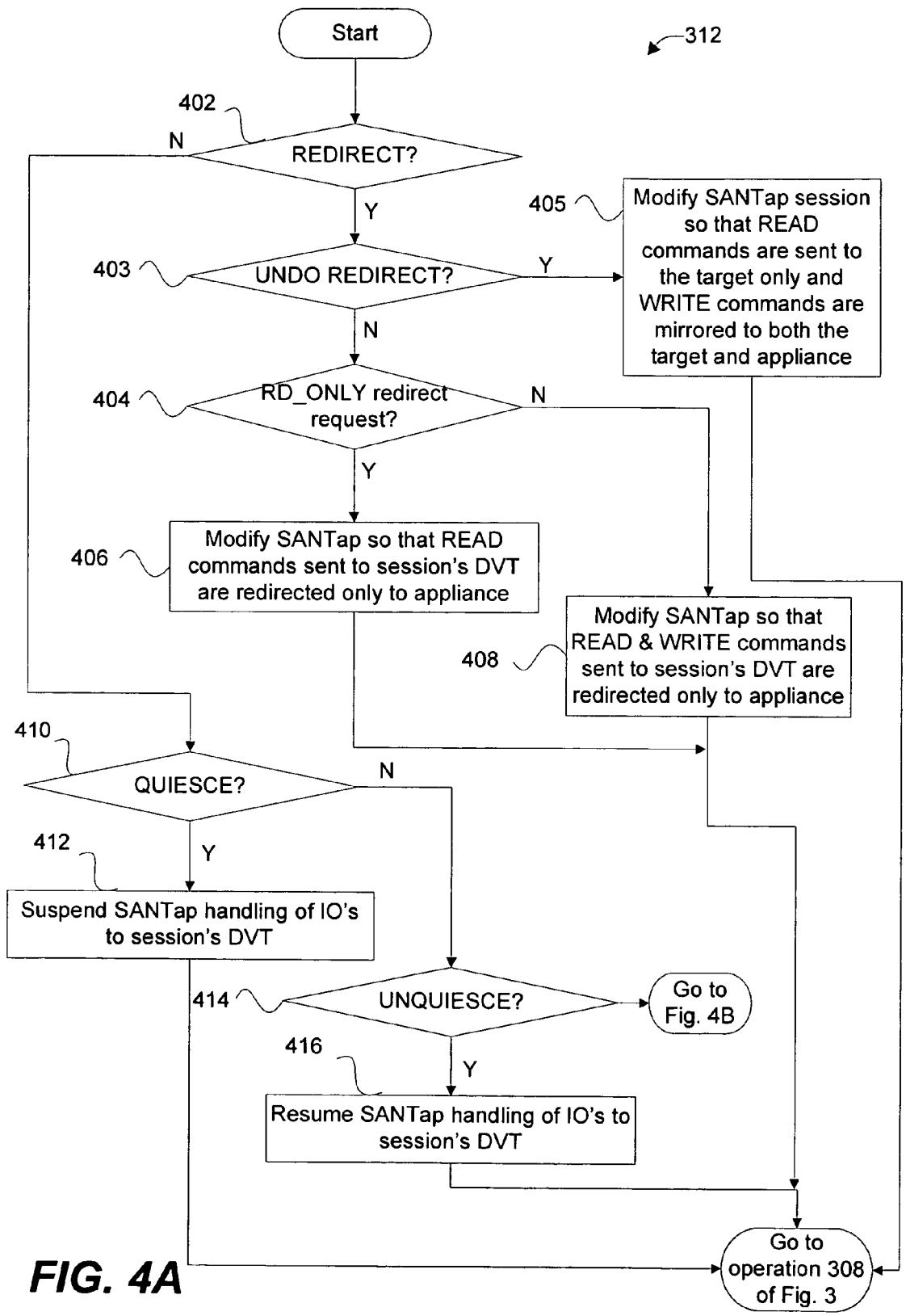
FIGS. 4A and 4B include a flowchart illustrating the operation of FIG. 3 for modifying a SANTap session based on a request by an appliance in accordance with example implementations of the present invention.
Figure 4B:
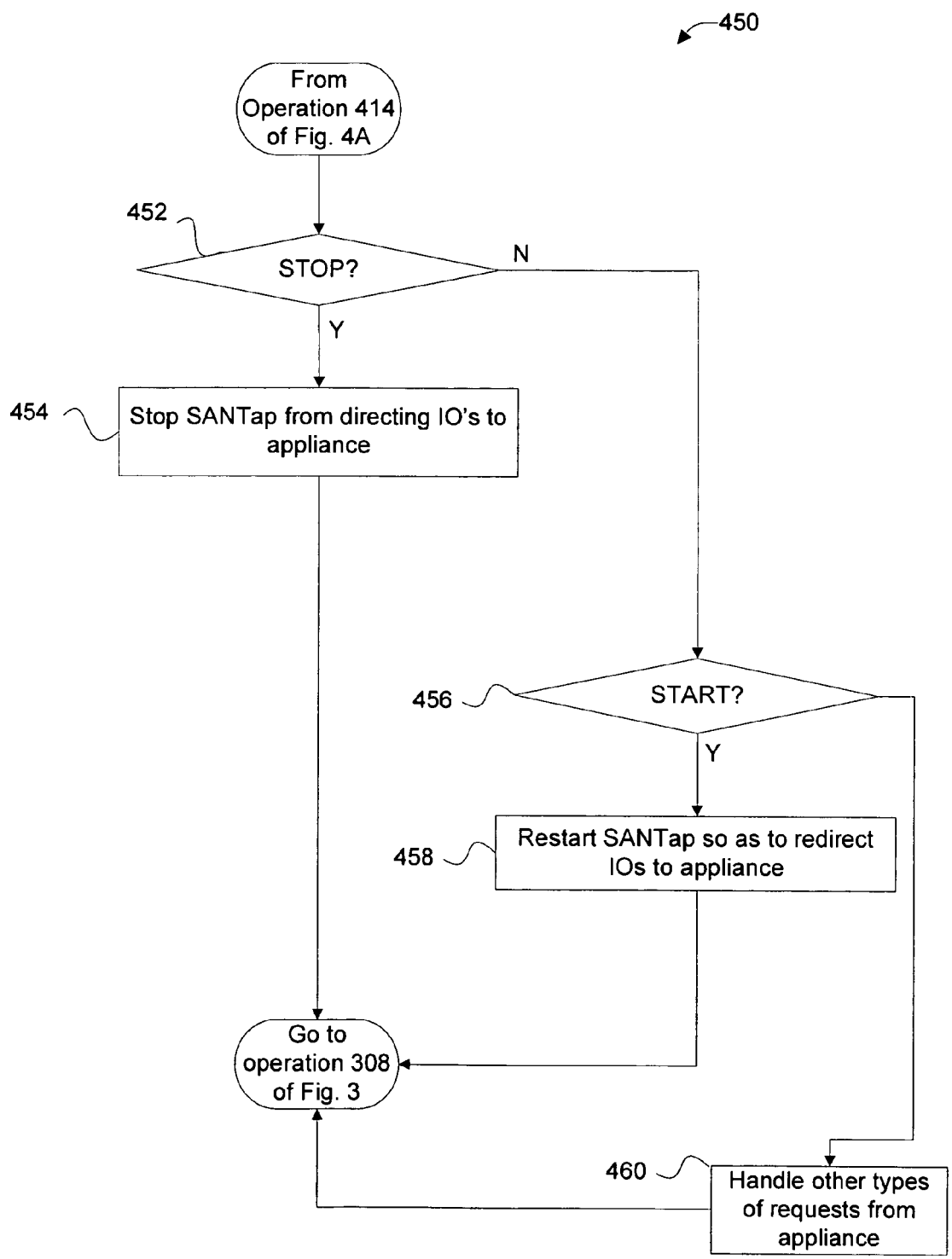

FIG. 4A through 4B include a flowchart illustrating the operation 312 of FIG. 3 for modifying a SANTap session based on a request by an appliance in accordance with one implementation of the present invention. Initially, it may be determined whether a REDIRECT type of request has been received from an appliance in operation 402. An appliance can use the REDIRECT and UNDO_REDIRECT type commands to control the mode of redirection on a per session basis. In this implementation, there are three types of REDIRECT requests for a specified SANTap session: RD_AND_WR, RD_ONLY, and UNDO. During normal operation (before receipt of a RD_AND_WR or RD_only redirect request or after receipt of an UNDO redirect request), WRITE commands are mirrored to both the target and appliance, while READ commands are sent only to the target. In the RD_AND_WR redirect mode, all READ and WRITE commands are sent only to the appliance and not the target. In the RD_ONLY mode, READ commands are sent only to the appliance and not the target, while WRITE commands continue to be mirrored to both the target and appliance.

Figure 6A:
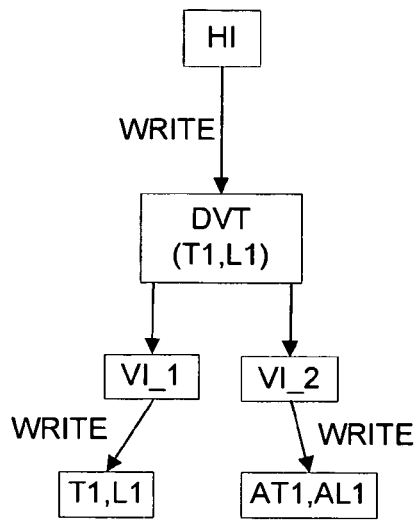
FIGS. 6A through 6D illustrate various redirection modes in accordance with one embodiment of the present invention.
Figure 6B:
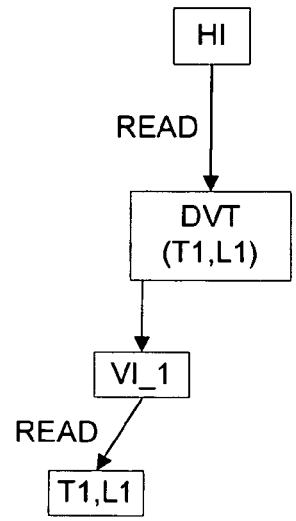
Figure 6C:
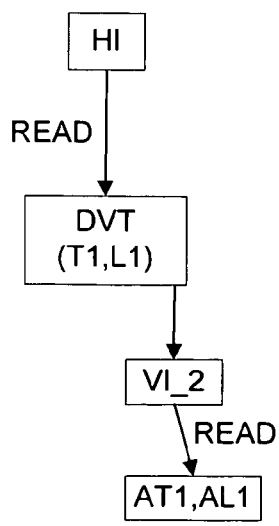
Figure 6D:
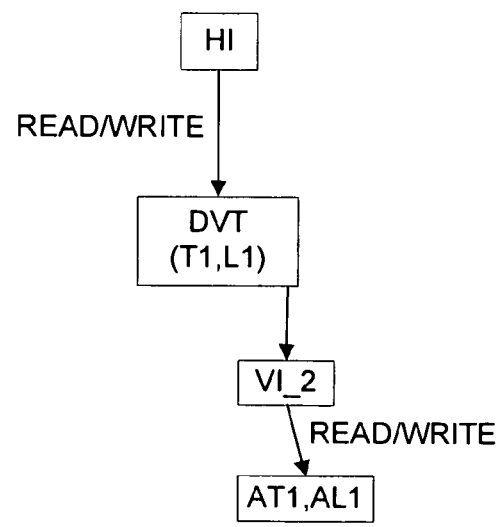

FIGS. 6A through 6D illustrate various redirection modes in accordance with one embodiment of the present invention. Each figure illustrates a volume hierarchy that may be used to specify the data flow direction between various entities that is taken for READ and/or WRITE commands for a particular session (i.e., H1, T1, L1). FIG. 6A illustrates a particular SANTap session's volume hierarchy data structure for a WRITE command sent from a host initiator (HI) to a particular DVT that has been set up for a particular target and LUN (T1,L1). When the WRITE command is received at the DVT it is mirrored to both the original destination target and LUN (T1, L1) and the appliance target and LUN (AT1,AL1). The volume hierarchy of FIG. 6A illustrates the actions taken for a WRITE command during normal SANTap operation and during a RD_ONLY redirect mode. FIG. 6B illustrates the actions for a READ command during normal SANTap operation. As shown, a READ command that is sent from HI to DVT is sent only to the original target and LUN, T1,L1. FIG. 6C shows the actions for a READ command during a RD_ONLY redirection mode. As shown, when a READ command is sent from HI to DVT, the READ is sent only to the appliance target and LUN, AT1, AL1. FIG. 6D illustrates the actions taken for both READ and WRITE commands during a RD_AND_WR redirection mode. When a READ or WRITE command is sent from the HI to the DVT, it is sent only to the appliance, target and LUN, AT1,AL1.

An appliance may use the RD_AND_WR redirect mode when the target is down so that all host I/O's can now be served by the appliance. The appliance uses the RD_ONLY redirect mode when the real target needs to be brought up so that the READ's are served by the appliance, but the WRITE's can be sent to both target and appliance. The normal [no redirect] mode of operation is set using UNDO REDIRECT when the real target is fully synchronized and can now serve the host READ and WRITE I/Os.

The redirect feature can be used is several other ways as well by the appliance to achieve control of redirection of I/Os. An example would be an appliance implementing caching to achieve fast WRITEs. SANTap's redirect RD_ONLY mode can be used to achieve this end application. This way, apart from the uses listed above, several other end application needs are served by this powerful REDIRECT feature.

Referring to the illustrated example, if a REDIRECT type of request has been received, it may first be determined whether the REDIRECT request is in the form of an UNDO redirect request in operation 403. If an UNDO redirect request has been received, the SANTap is modified so that READ commands are sent only to the target and WRITE commands are mirrored to both the target and appliance in a normal SANTap mode in operation 405. The SANTap modification process then jumps to operation 308 of FIG. 3.

If an UNDO redirect request has not been sent, it may then be determined whether the REDIRECT request is a RD_ONLY redirect request in operation 404. If the request is a RD_ONLY redirect request, the SANTap is modified so that READ commands sent to the DVT are redirected only to the appliance (and not the target) in operation 406. For example, the volume hierarchy data structures for the affected session can be modified to as shown in FIGS. 6A and 6C. In this mode, the WRITE command for the affected session continue to be mirrored to both the target and appliance as represented in FIG. 6A, while the READ commands are redirected to only the appliance and not the target as shown in FIG. 6C. The process then jumps to operation 308 of FIG. 3.

If the REDIRECT request is not a RD_ONLY redirect request, it is assumed to be a RD_AND_WR redirect request and the SANTap is modified so that READ and WRITE commands sent to the DVT are redirected only to the appliance (and not the target) in operation 408. The volume hierarchy for the affected session may be modified as shown in FIG. 6D. The procedure then proceeds to operation 308 of FIG. 3.

If no REDIRECT request is received, it may then be determined whether a QUIESCE request has been received in operation 410. While delivering the end applications of remote replication, data migration, snap shot, etc., the following issues may arise:

- there may be situations of congestion
- there may be a need to nondisruptively, and yet in a consistent manner, retrieve the journals/logs which are needed to resynchronize the appliance with the target
- there may be a need to change the different controls or parameters of replication which are transparent to host application, like an appliance LUN change, WWN change, validity of the journals/logs, etc QUIESCE can solve all of the above issues and much more. Using the QUIESCE mechanism, the appliance can temporarily suspend SANTap handling of any I/O's and thus bring SANTap to a stable state, while the appliance then performs its required sequence of operations, like log retrieval or change of replication parameters etc. I/O's may then be resumed using the UNQUIESCE request. This temporary PAUSING of I/O's is transparent to the host and, hence, does not affect the host application. Without this mechanism, there is no way for the appliance to nondisruptively perform book keeping or parameter adjustments.

Similarly when there is a temporary congestion, the appliance can use QUIESCE to pause the host I/O's, recover from congestion, and then resume the I/O's using UNQUIESCE. This way, the host application is unaffected. Without the presence of this feature, SANTap may experience I/O failures to the appliance and may treat the appliance as down, which will prove costly for the appliance as it may need to again resynchronize with the target.

Apart from the above listed uses, the appliance can use this powerful mechanism of QUIESCE/UNQUIESCE to handle several situations as well. For example, if there needs to be a quick maintenance on the appliance side, the QUIESCE/

UNQUIESCE tool can be used so that the session does not go down during appliance's unavailability.

Referring now to the illustrated embodiment, if a QUIESCE modification for a particular SANTap session is received, the SANTap handling of I/O's for the session's DVT is suspended in operation 412. For instance, any I/O's for the specified session are queued by a data path processor and memory in the switch. In a specific implementation, the volume hierarchy for the particular mode may be modified so as to queue data that is received in the DVT. The current Error Log state may also be maintained during the quiesce state. The SANTap modification process then jumps to operation 308 of FIG. 3. If a QUIESCE is not received, it may then be determined whether an UNQUIESCE is received in operation 414. If an UNQUIESCE modification request is received, the SANTap handling of I/O's for the session's DVT is then resumed in operation 416. The procedure then goes to operation 308 of FIG. 3.

If a QUIESCE or UNQUIESCE modification request is not received, the procedure then goes to operation 452 of FIG. 4B, where it is determined whether a STOP request has been received in operation 452. If a STOP request is received, the SANTap is stopped from mirroring I/O's to the appliance in operation 454. The operation then goes to operation 308 of FIG. 3. If a STOP request is not received, it may then be determined whether a START request has been received in operation 456. If a START request is received, the SANTap resumes mirroring WRITE I/O's to the appliance in operation 458. The SANTap modification process then goes to operation 308 of FIG. 3. If no modification requests are received, various other types of requests or messages from the appliance may be handled in operation 460. The procedure may then go to operation 308 of FIG. 3.

While delivering end applications like remote replication, data migration, snapshot, etc there may be challenges like appliance failure, appliance congestion, appliance replacement, etc., all of which are preferably handled so as to not disrupt the host application. The START and STOP features are mechanisms provided by SANTap to handle such situations. An appliance can STOP a particular session and cause the I/O's to be sent only to the real target/array—thereby leaving the host application undisturbed.

During this stopped duration, SANTap may be configured to track the various I/O's missed by the appliance, using the Error Log, for example. When the appliance has successfully handled the replacement/congestion/failure/etc., the appliance can then retrieve and use these logs to resynchronize with the target. The appliance may then use a START request to instruct SANTap about its readiness to receive I/O's. At this point, the appliance is fully back and receiving the replicated I/O's from SANTap and the host application is unaffected during the entire process.

Any modifications described herein may affect the data path for SANTap I/O differently. For instance, a STOP modification causes all I/O's for a particular appliance to be stopped, while a QUIESCE causes all I/O's to be suspended for both the target and appliance Similarly, a redirection mode change causes I/O's to be removed for the READ and/or WRITE data sent to the target. As a result of these data path changes, each modification may include recalculation of data path weights. In some implementations, the SANTap data is mirrored to multiple paths and these paths are weighted to determine to which path to send the mirrored data. Therefore, when one of the paths is removed for a particular modification, the weights for all remaining paths are recalculated. For example, when a path is removed, a one of the remaining path may be given a higher weight than the removed path, while the removed data path (or mirror) weight is changed to zero. Additionally, the different modifications to SANTap may include various techniques for handling failures, such as I/O failures with respect to the target, host, or appliance, and these techniques may vary with each mode of operation of SANTap as desired.

Figure 7A:
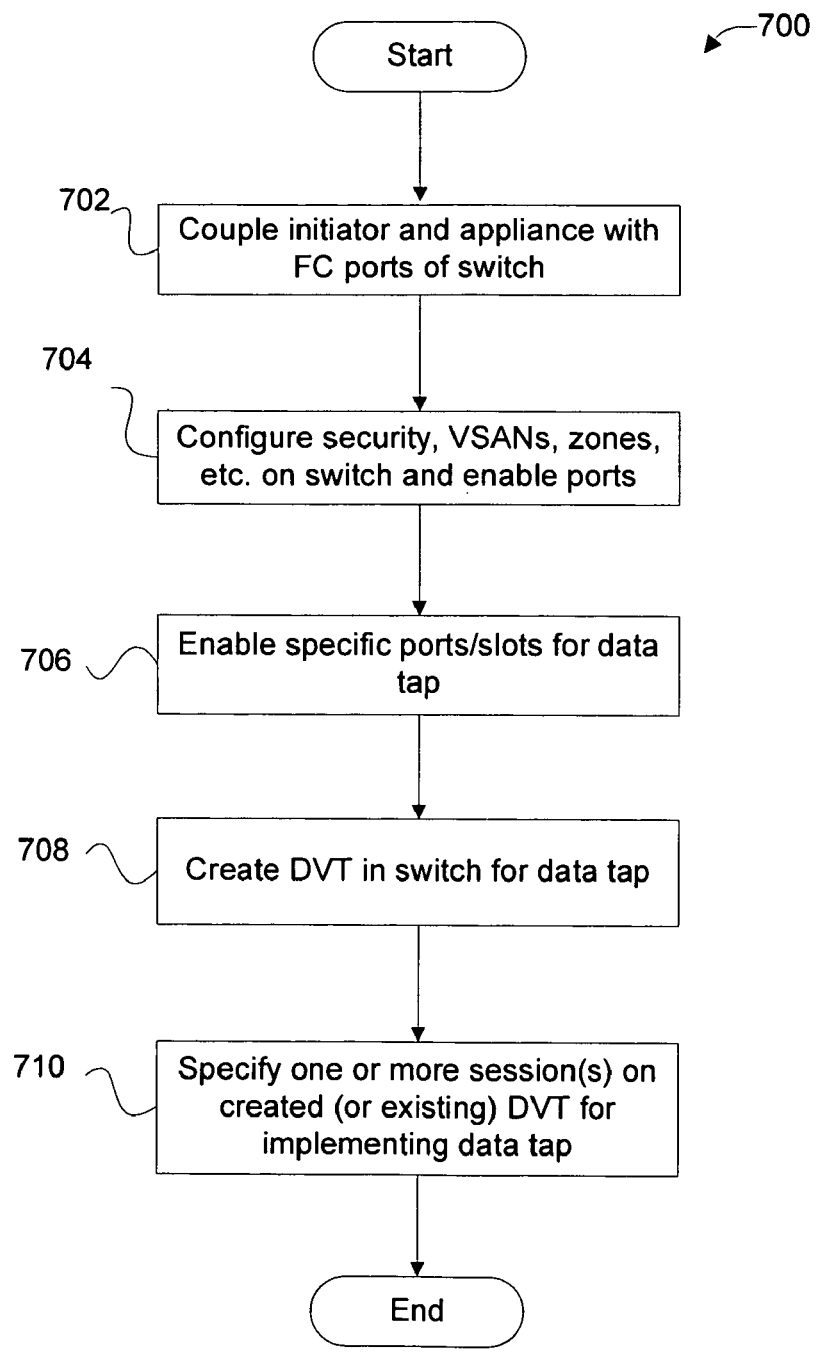
FIG. 7A is a flow chart illustrating a general process for enabling data tapping between a SAN or VSAN initiator and target in accordance with one embodiment of the present invention.

Mechanisms for setting up SANTap's general data tapping feature will now be described. FIG. 7A is a flow chart illustrating a general process 700 for enabling data tapping between a SAN or VSAN initiator and target in accordance with one embodiment of the present invention. This process 700 provides set up of the data tap with minimum disruption. Initially, an initiator and appliance are coupled with ports (e.g., FC ports) on a network device (e.g., switch) in operation 702. This coupling may be direct or indirect. That is, the initiator or appliance may be coupled through one or more other network devices (e.g., switches or routers) as explained further below with respect to different data tapping modes of operation. Additionally, the appliance may access the data tap switch via any suitable network devices, such as other switches and/or routers. Of course, the initiator and appliance may also have access to other switches that serve the same target (e.g., a redundant switch). In this example, it is assumed that the targets or storage devices are already coupled with the switch.

Security, VSANs, zones, etc. may next be configured and the ports enabled on the data tap switch in operation 704. For example, the switch may be configured with an SNMP username and password to allow access to the switch by users. VSAN groups and zones may also be configured on the switch for each port/slot, for example. Specific ports/slots of the data tap switch may then be enabled for a data tap in operation 706. That is, particular ports and/or slots may be designated as allowing data tapping, while others are designated as not allowing data tapping. These switch configurations may be configured by any suitable entity, such as an administrator or software agent.

A DVT (and VI) may then be created on an enabled port/slot of the switch for implementing the data tap feature in operation 408. One or more session(s) may then be specified for the created DVT (and VI) for implementing the data tap in operation 410. Several techniques for creating a DVT and VI are further described below. In one implementation, an appliance specifies that a DVT is to be created for a particular target and then the switch automatically creates such DVT and corresponding VI. The procedure for setting up a data tap then ends.

A DVT (and VI) may take any suitable form for facilitating the data tap between an initiator and target. Three modes are described herein: proxy mode 1, proxy mode 2, and transparent mode. Each of these modes has its own associated advantages, as well as disadvantages. Each of these modes uses different identities for the DVT, where each identity is in the form of a World Wide Name (WWN) and Fibre Channel Network Identifier (FCID). Within a Fibre Channel network, all Fibre Channel devices have a World Wide Name (WWN). More specifically, a Node WWN (NWWN) is the WWN of the node that is connected to a particular port. In other words, the NWWN is the WWN of the system, storage device, or subsystem that is connected to the switch port. In addition to a Node WWN, a Port WWN (PWWN) serves as a given name for a particular port (FWWN for a particular fiber port). A Fibre Channel network ID (FCID) for the particular switch port is used to identify the physical location of a port. Each Fibre Channel device may have multiple ports, each of which is uniquely identified by a NWWN and a PWWN. In the following description, PWWN or NWWN may be used interchangeably with the shortened identifier "WWN."

In the proxy mode 1, the DVT gets a new PWWN and a new FCID. This arrangement allows the initiator and target to sit anywhere in the network and not be directly coupled to a port of the switch on which resides the DVT. That is, the DVT may reside anywhere in the network with respect to the initiator and target. When the initiator sends data to the DVT, the routing protocol will then work to forward the data to the DVT wherever it resides. When the data reaches the DVT, the routing then handles forwarding the data to the target and appliance (e.g., via a VI associated with the DVT).

Figure 7B:
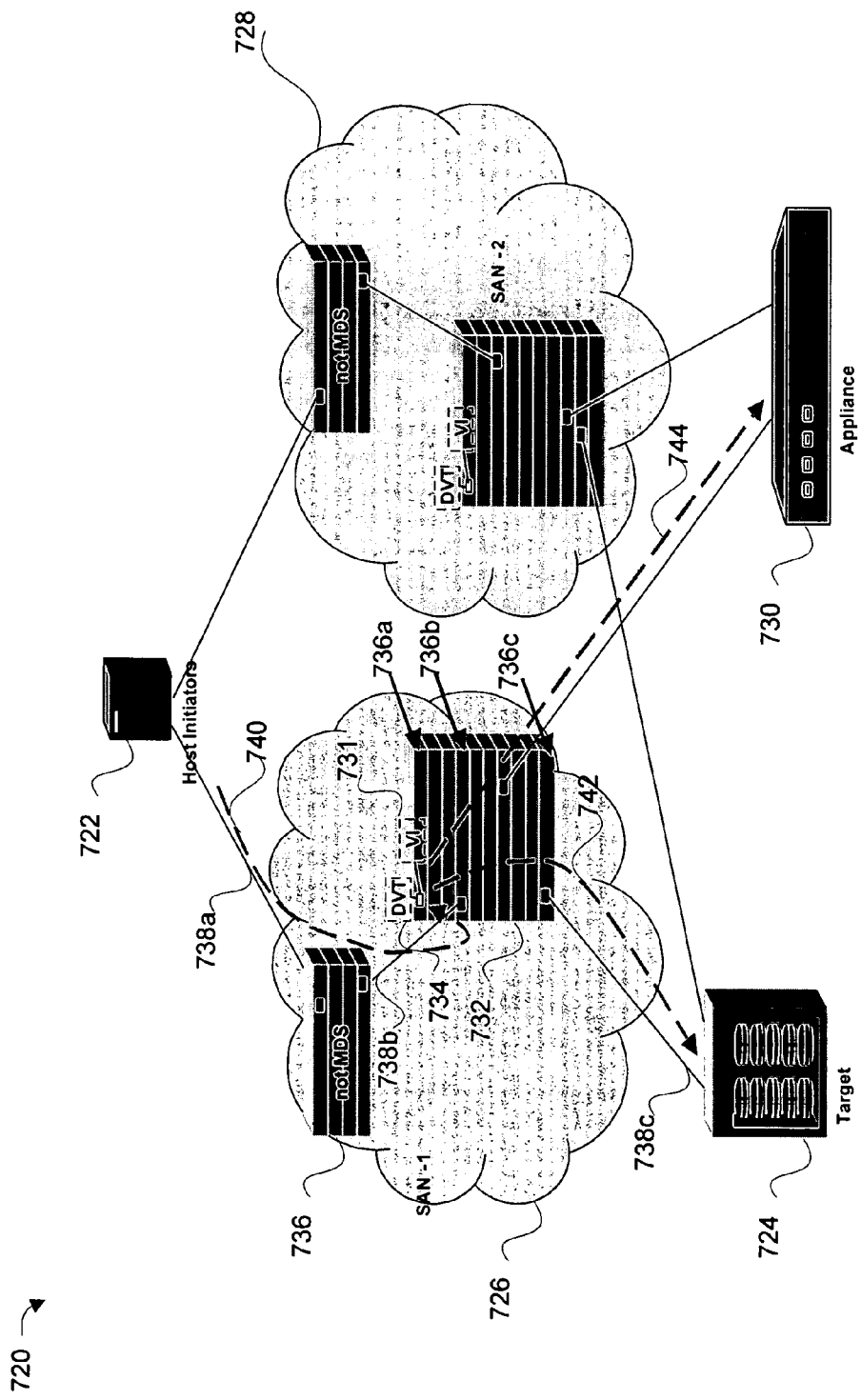
FIG. 7B illustrates a data tapping configuration in a first proxy mode (proxy mode 1) of operation in accordance with a first implementation of the present invention.

FIG. 7B illustrates a data tapping configuration in a first proxy mode (proxy mode 1) of operation in accordance with a first implementation of the present invention. As shown, a host initiator 722 is coupled to a non-MDS switch 736 that is not configurable with a DVT. The non-MDS switch 736 is itself coupled to an MDS switch 732 on which resides a DVT 734. The MDS switch 732 is coupled to a target 724. The devices in the path between the initiator and the target represent a first SAN 726. Also shown is a redundant path between the initiator 722 through a second SAN 728. Either path may be used by initiator 722, depending on which path is active or failing.

Since the DVT has a unique PWWN and FCID, the DVT 734 can be positioned in a different path than the path that is between the initiator 722 and the target 724 and data can still be routed properly from the initiator to the DVT and then to the target. Also, the path between the initiator and target may contain non-MDS switches that simply are configured to route data to ports or nodes having unique PWWN and FCID pairs and do not have to be configured to implement MDS functions such as VSAN groups.

As shown for the first SAN 726, the DVT 734 and VI 731 reside on a different intelligent line card in the MDS switch 732 than the ports which are coupled directly to the non-MDS switch 736 (and indirectly the initiator) and target 724. That is, the initiator 722 is coupled to a port on the non-MDS switch 736 via path 738a; the non-MDS switch 736 is then coupled directly to a port of line card 736b of MDS switch 732 via path 738b; and a port the MDS switch 732 on line card 736c is coupled directly to the target via path 738c. In contrast, the DVT 734 is in the form of a port that resides on line card 736a. Data can be routed from the initiator to the target 724 through paths 740 and 742. The data or a copy of the data is also routed via path 744 to appliance 730. A standard routing protocol is used to accomplish these data routes.

Of course in this implementation, the initiator 722 needs to obtain the new PWWN and new FCID of the DVT. In this case, when the DVT is created in the switch, the initiator is not aware of the new FCID or new PWWN. That is, the initiator 722 is only aware of the PWWN and FCID that were obtained from the switch in its initial login procedure to the switch 732 port. The initiator needs to know the new FCID and PWWN of the new target DVT in order to access the new target (i.e., DVT). Also, many current implementations do not make use of mechanisms for initiators to automatically learn about new available targets (i.e., DVT). Instead, files are typically manually created on a host to tell it what targets it must use. Thus, under current protocols the initiator's configuration is changed so that the new PWWN and new FCID of a new DVT are provided to the associated initiator 722. In one implementation, an administrator may configure these identifies (e.g., PWWN and FCID of the DVT) in the initiator 722 after a new DVT is set up. More typically, the initiator is configured with the new PWWN and obtains the new FCID by a new login procedure to the name server using the PWWN of the target. Mappings between the DVT and both the real target and appliance are also set up in the switch to facilitate routing and data tapping.

Perhaps in future protocol versions when mechanisms are universally implemented to automatically inform the initiator of new targets, the initiators will never have to be manually configured. Since under the present protocol the initiator needs to be configured with the new PWWN and FCID, this mode is disruptive and data exchange between the initiator and DVT cannot commence until reconfiguration is complete.

Figure 7C:
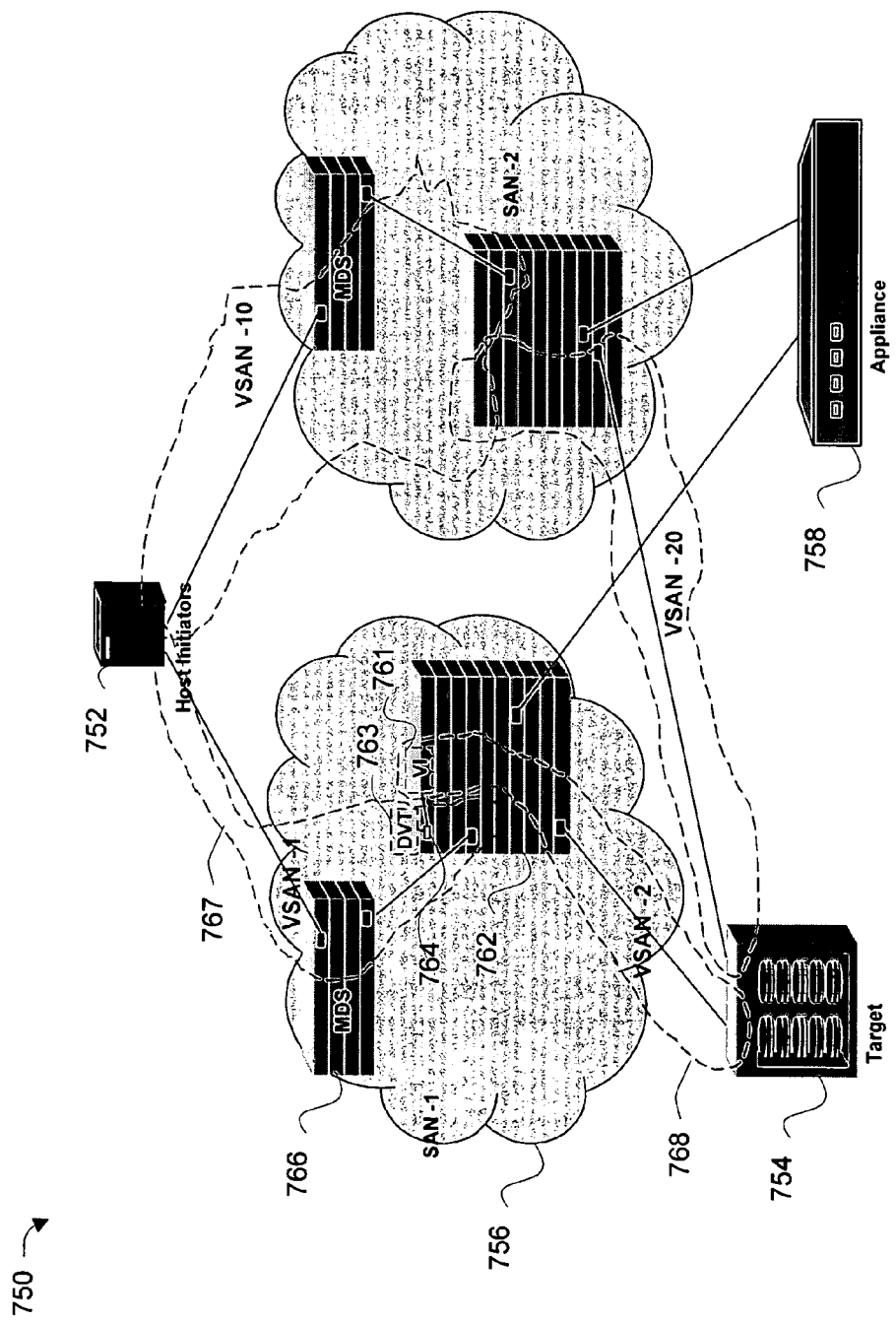
FIG. 7C illustrates a data tapping configuration in a second proxy mode (proxy mode 2) of operation in accordance with a second implementation of the present invention.

FIG. 7C illustrates a data tapping configuration in a second proxy mode (proxy mode 2) of operation in accordance with a second implementation of the present invention. In this mode, the DVT has the same PWWN as the corresponding target and a new FCID that differs from the target's FCID. In this mode, the initiator does not have to be reconfigured with the PWWN of the target. In one implementation of the Fibre Channel protocol, the initiator can use this same PWWN of the original target to then log in to get the new FCID of the new DVT. For instance, the initiator disconnects and reconnects to the switch (or the data tap service sends a disconnect to the initiator which would result in an automatic reconnect) to perform an initialization procedure so as to obtain the new FCID of the new DVT. Alternatively, the initiator can accomplish the same thing by performing a software restart.

In a current implementation (and perhaps future implementations) of Fibre Channel protocol, the same target cannot have a same PWWN unless they reside in different VSANs. Thus, DVT belongs to a first VSAN 767, while the original target and target port belong to a second different VSAN 768. Another entity referred to as a virtual initiator (VI) 761 may also be used to log into the target to obtain identification information (e.g., FCID) of the target and then to route data received at the DVT 764 from itself in its role as an initiator to the target 754. In this implementation, the VI 761 belongs to the same VSAN 768 as the target 754. If there are any switches present between the initiator and the switch that is implementing the DVT, the intervening switches have to be configurable with a particular VSAN. That is, an intervening switch between the initiator and the DVT switch has to be configured with the same VSAN as the DVT. In the illustrated embodiment, a MDS switch 766 is present between the initiator 752 and the switch 762 having the DVT 763 although any suitable switch that implements VSANs may be utilized. Likewise, any intervening switch positioned between the switch 762 having the DVT 763 and VI 761 and the target 754 needs to be configurable with a particular VSAN (not shown). That is, an intervening switch between the initiator and the DVT (or VI) switch has the same VSAN as the VI. The intervening switch also allows traffic for its own VSAN.

In both proxy modes 1 and 2, the VI uses a different FCID then the DVT. In the proxy mode 2, the VI also uses different FCIDs when sending data to the real target and the appliance, while in proxy mode 1 the VI uses the same FCID. In a specific proxy mode 2 implementation, two VIs are used: one to write to the real target and the other to write to the appliance. These two VIs have different FCIDs and different WWNs. The reason that the DVT and VIs have different FCIDs in proxy mode 2 is that the VIs are sending data to different VSANs when they are sending data to the appliance and the target. That is, the appliance is either in the same VSAN as the initiator or the target, but not both. The Appliance could also be in a third VSAN which is neither the initiator VSAN nor the target VSAN. Thus, the VIs must have a unique identity in each VSAN in order to send data to each VSAN.

Both of the proxy modes 1 and 2 require some reconfiguration and/or re-initialization of the initiator to obtain a new PWWN and/or new FCID of the new DVT. Another mode that does not require any reconfiguration or re-initialization of the initiator is referred to as a "transparent mode." The transparent mode includes setting up a new DVT that has a same PWWN and same FCID as the original target. In other words, creation of a new DVT (and VI) between the initiator and original target does not cause any disruption in the communication between the initiator and original target. Once the DVT is set up, data flows seamlessly between the initiator and original target without any changes from the initiator's or the target's side. Advantageously, the initiator does not have to be informed about the new DVT, but can simply continue sending data to the original target before, during, and after creation of a new DVT without disruption.

In this implementation, the DVT and its associated VI can merely serve as software entities and do not require any physical manifestation. That is, the new DVT does not have to be advertised to the devices outside the switch as an available physical target. The initiators do not have to become aware of the new DVT. The DVT and VI can merely serve as entities that perform the data tapping between the initiator and the real target.

Figure 7D:
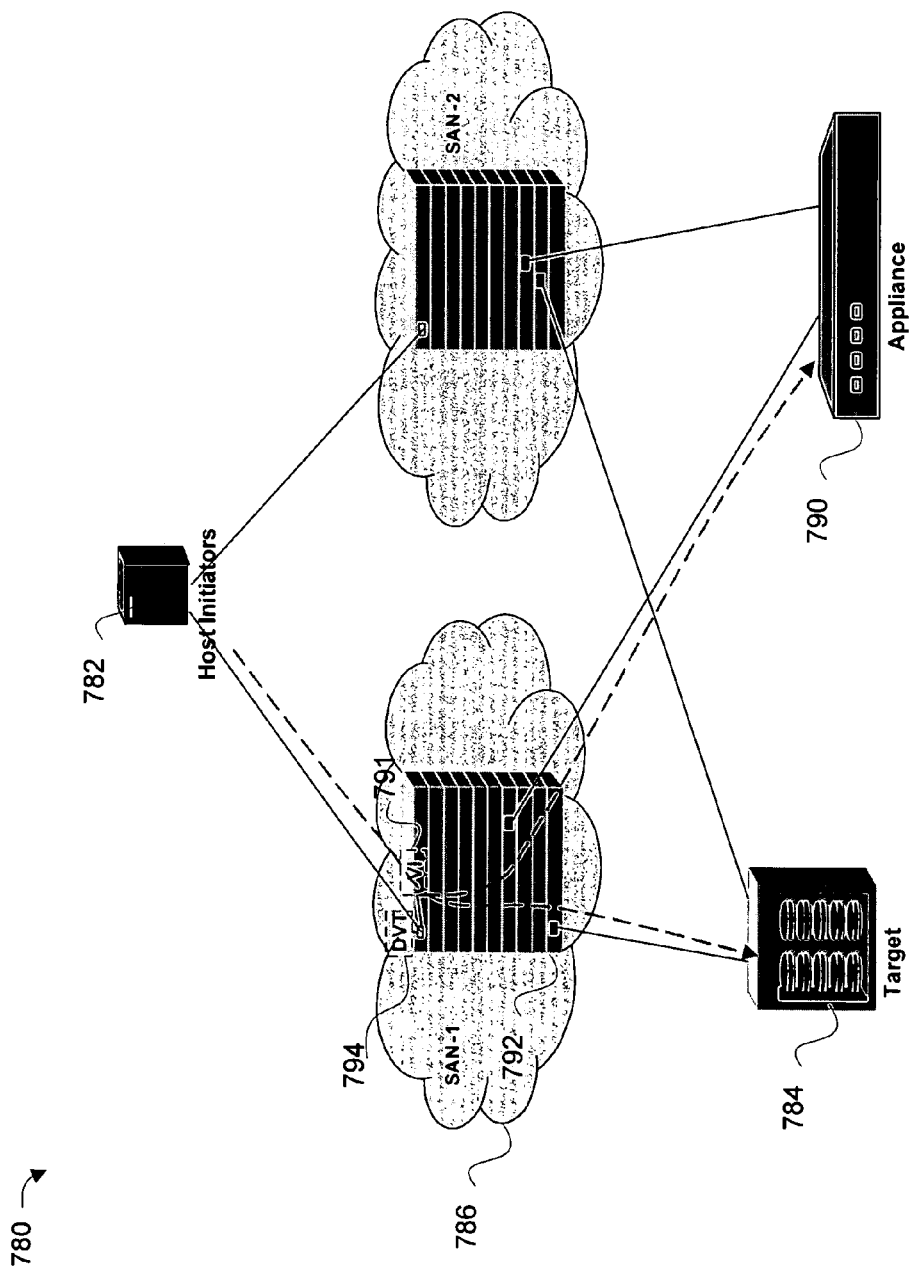
FIG. 7D is a diagrammatic representation of an example data tapping configuration in a transparent mode in accordance with a third implementation of the present invention.

FIG. 7D is a diagrammatic representation of an example data tapping configuration in a transparent mode in accordance with a third implementation of the present invention. As shown, an initiator 782 is coupled with switch 792 of SAN 786. The switch 792 is coupled with a target 784 and an appliance 790. When a DVT 794 having the same PWWN and FCID as the target 784 is created in the switch, data is, in effect, routed from the initiator 782 to the DVT 794. A virtual initiator (VI) 791 then routes the data received by the DVT to both the target 784 and the corresponding appliance 790. In a sense, the DVT can be said to merely snoop the traffic going from the initiator to the target. The DVT identifies traffic going between the initiator and target and copies such identified data. This copied data is then routed to the appliance 784.

In this implementation, the DVT needs to be placed in the routing path between the initiator and the target so as to ensure that the DVT receives the data sent between the initiator and target. Thus, in the illustrated implementation, the initiator and target are both coupled directly to the switch although only one of these devices needs to be connected directly to the switch that contains the data tapping DVT for such devices.

For all three modes relationships between the new DVT, initiator, original target, and appliance are also retained or set up in the switch. In one implementation, mappings between the connected entities are generated in the switch to thereby facilitate routing between the initiator and the new DVT, between the new DVT (and new VI) and the original target, and between the new DVT (and VI) and appliance, as well as the data tapping features for sending data from the DVT to both the original target and the corresponding appliance. VSAN and zoning may also be setup for each new DVT and VI pair. Several embodiments for creating a virtual port and their associated mappings are further described in co-pending U.S. patent applications (1) application Ser. No. 10/056,238 entitled "METHODS AND APPARATUS FOR IMPLEMENTING VIRTUALIZATION OF STORAGE WITHIN A STORAGE AREA NETWORK" filed 23 Jan. 2002 by Thomas James Edsall et al. and (2) application Ser. No. 10/045,883 entitled "METHODS AND Apparatus for Implementing Virtualization of Storage within a STORAGE AREA NETWORK THROUGH A VIRTUAL ENCLOSURE" filed 9 Jan. 2002 by Sanjaya Kumar et al., which applications are herein incorporated by reference in their entirety for all purposes.

Figure 8:
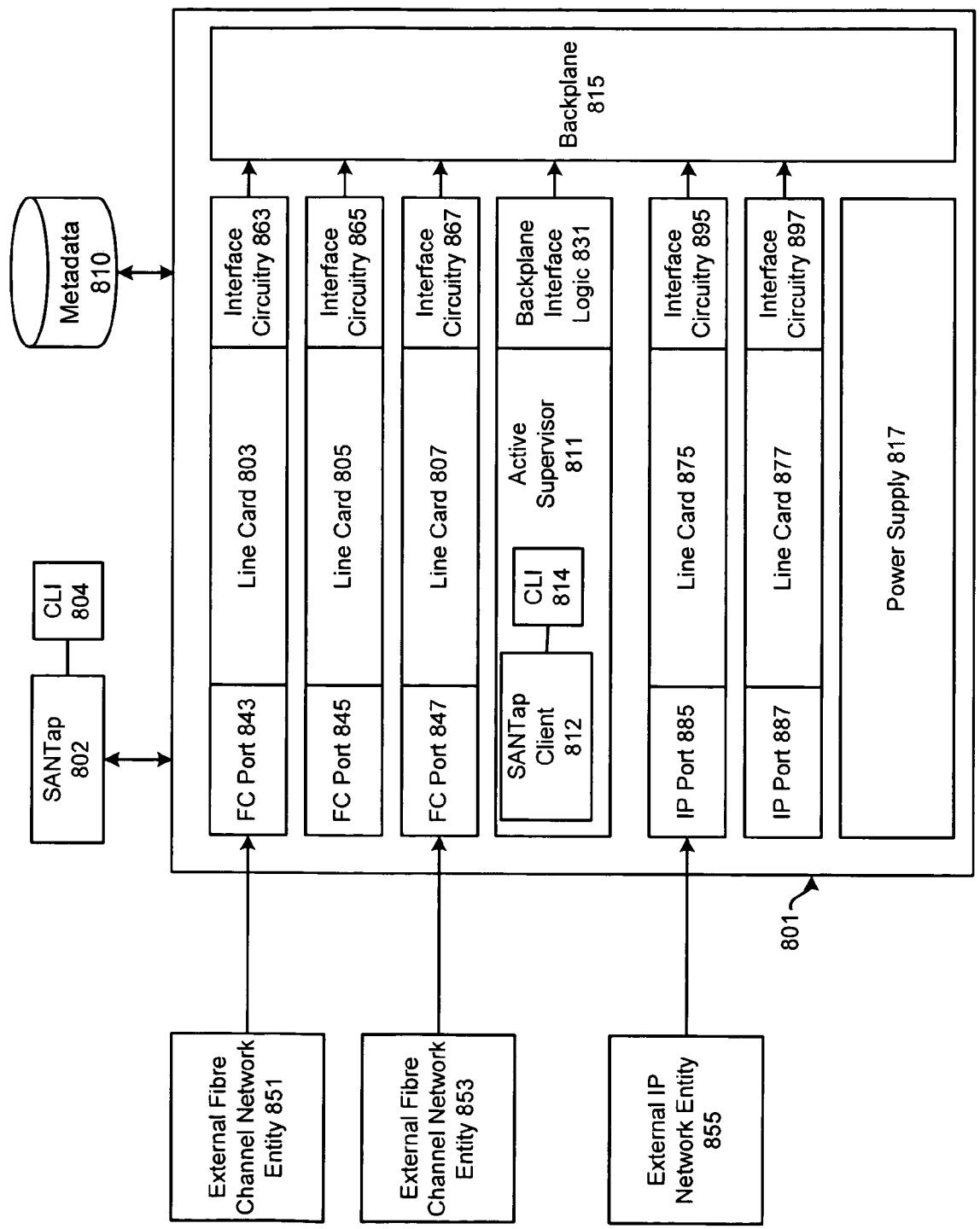
FIG. 8 is a diagrammatic representation of one example of a fibre channel switch that can be used to implement techniques of the present invention.

FIG. 8 is a diagrammatic representation of one example of a fibre channel switch 801 that can be used to implement techniques of the present invention. Although one particular configuration will be described, it should be noted that a wide variety of switch and router configurations are available. The switch 801 may include, for example, at least one interface for communicating with one or more SANTap(s) 802. In at least one implementation, the SANTap 802 may reside external to the switch 801, and may also be accessed via a command line interface (CLI) 804. The switch 801 may include at least one interface for accessing external metadata information 810.

The switch 801 may include one or more supervisors 811 and power supply 817. According to various embodiments, the supervisor 811 has its own processor, memory, and/or storage resources. Additionally, the supervisor 811 may also include one or more SANTap clients (e.g., SANTap client 812) which may be adapted, for example, for facilitating communication between the SANTap 802 and the switch. The supervisor's SANTap clients may also each be accessed via a command line interface (CLI), e.g., 814.

Figure 9:
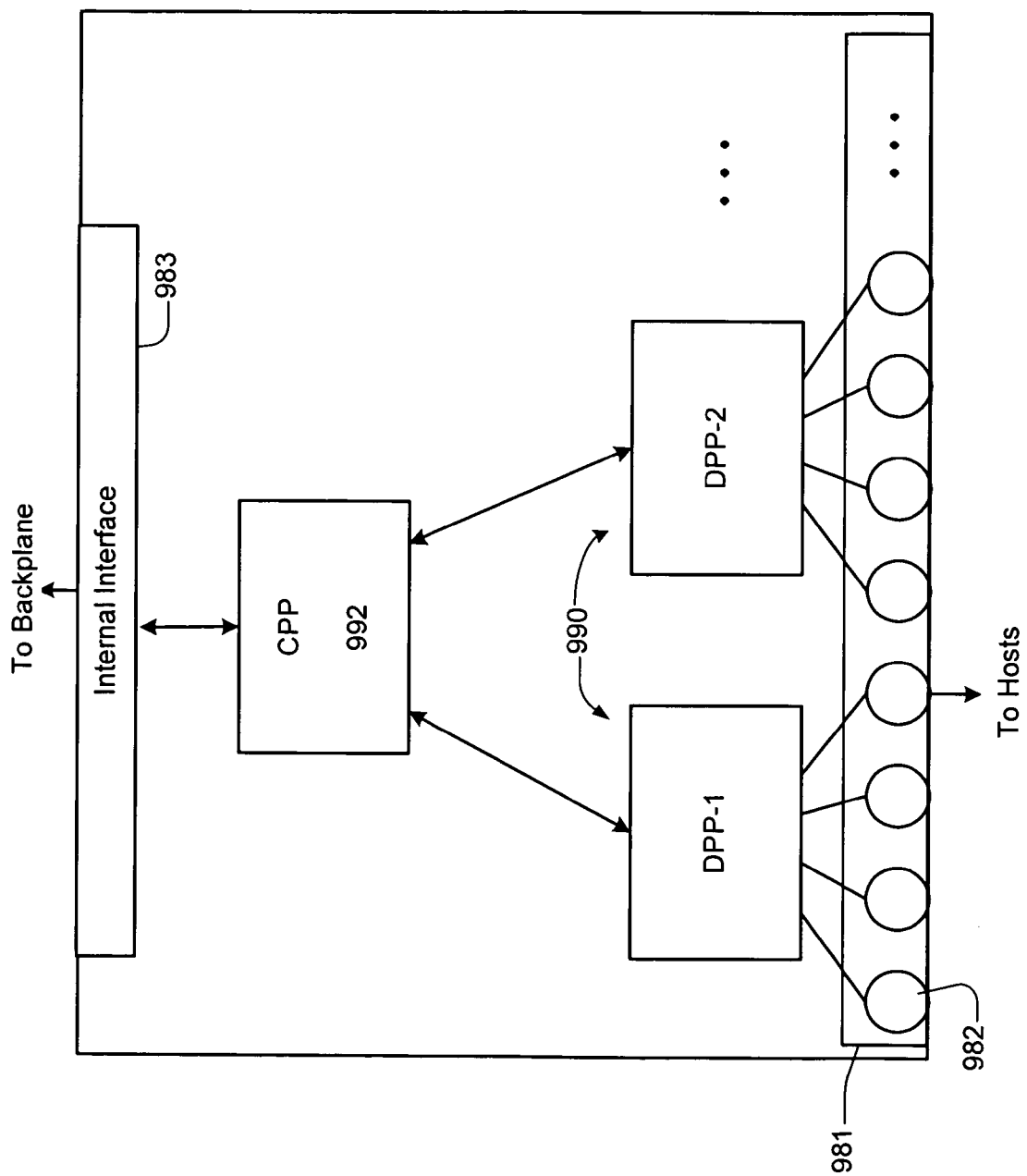
FIG. 9 is a block diagram illustrating a portion of an exemplary switch or intelligent line card in which various embodiments of the present invention may be implemented.

Line cards 803, 805, and 807 can communicate with an active supervisor 811 through interface circuitry 863, 865, and 867 and the backplane 815. According to various embodiments, each line card includes a plurality of ports that can act as either input ports or output ports for communication with external fibre channel network entities 851 and 853. An example of at least a portion of a line card is illustrated in FIG. 9 of the drawings.

The backplane 815 can provide a communications channel for all traffic between line cards and supervisors. Individual line cards 803 and 807 can also be coupled to external fibre channel network entities 851 and 853 through fibre channel ports 843 and 847.

External fibre channel network entities 851 and 853 can be nodes such as other fibre channel switches, disks, RAIDS, tape libraries, or servers. The fibre channel switch can also include line cards 875 and 877 with IP ports 885 and 887. In one example, IP port 885 is coupled to an external IP network entity 855. The line cards 875 and 877 also have interfaces 895 and 897 to the backplane 815.

It should be noted that the switch can support any number of line cards and supervisors. In the embodiment shown, only a single supervisor is connected to the backplane 815 and the single supervisor communicates with many different line cards. The active supervisor 811 may be configured or designed to run a plurality of applications such as routing, domain manager, system manager, port manager, FLOGI server, utility applications, etc. The supervisor may include one or more processors coupled to interfaces for communicating with other entities.

In addition, although an exemplary switch is described, the above-described embodiments may be implemented in a variety of network devices (e.g., servers) as well as in a variety of mediums. For instance, instructions and data for implementing the above-described invention may be stored on a disk drive, a hard drive, a floppy disk, a server computer, or a remotely networked computer. Accordingly, the present embodiments are to be considered as illustrative and not restrictive, and the invention is not to be limited to the details given herein, but may be modified within the scope and equivalents of the appended claims.

FIG. 9 is a block diagram illustrating a portion of an exemplary switch or intelligent line card in which various embodiments of the present invention may be implemented. According to a specific embodiment, switch portion 980 of FIG. 9 may be implemented as one of a plurality of line cards residing in a fibre channel switch such as that illustrated in FIG. 8, for example. In at least one implementation, switch portion 980 may include a plurality of different components such as, for example, at least one external interface 981, at least one data path processor (DPP) 990, at least one control path processor (CPP) 992, at least one internal interface 983, etc.

As shown in the example of FIG. 9 the external interface of 981 may include a plurality of ports 982 configured or designed to communicate with external devices such as, for example, host devices, storage devices, etc. One or more groups of ports may be managed by a respective data path processor (DPP) unit. According to a specific implementation the data path processor may be configured or designed as a general-purpose microprocessor used to terminate the SCSI protocol and to emulate N_Port/NL_Port functionality. It may also be configured to implement RAID functions for the intelligent port(s) such as, for example, striping and mirroring. In one embodiment, the DPP may be configured or designed to perform volume configuration lookup, virtual to physical translation on the volume address space, exchange state maintenance, scheduling of frame transmission, and/or other functions. In at least some embodiments, the ports 982 may be referred to as "intelligent" ports or "iPorts" because of the "intelligent" functionality provided by the managing DPPs. Additionally, in at least some embodiments, the term iPort and DPP may be used interchangeably when referring to such "intelligent" functionality. In a specific embodiment of the invention, the virtualization logic may be separately implemented at individual ports of a given switch. This allows the virtualization processing capacity to be closely matched with the exact needs of the switch (and the virtual enclosure) on a per port basis. For example, if a request is received at a given port for accessing a virtual LUN address location in the virtual volume, the DPP may be configured or designed to perform the necessary mapping calculations in order to determine the physical disk location corresponding to the virtual LUN address.

As illustrated in FIG. 9, switch portion 980 may also include a control path processor (CPP) 992 configured or designed to perform control path processing for storage virtualization. In at least one implementation, functions performed by the control path processor may include, for example, calculating or generating virtual-to-physical (V2P) mappings, processing of port login and process login for volumes; communicating with name server(s); etc.

Although the foregoing invention has been described in some detail for purposes of clarity of understanding, it will be apparent that certain changes and modifications may be practiced within the scope of the appended claims. For example, although a DVT is described as tapping data for one or more specific sessions, of course, the DVT data tapping may be configured to tap all data for a specific target or specific LUN of a target, etc. Therefore, the described embodiments should be taken as illustrative and not restrictive, and the invention should not be limited to the details given herein but should be defined by the following claims and their full scope of equivalents.

What is claimed is:

1. A method of modifying a data tapping process in a storage area network (SAN), the method comprising:
at a network device of the SAN, providing a data tapping mechanism for an appliance to receive SAN data that is being sent from a host to a storage device, wherein the appliance and the storage device are both physical devices and providing the data tapping mechanism includes creating a control virtual target (CVT) for receiving requests from the appliance to modify the tapping mechanism for the appliance, a data virtual target (DVT) for intercepting data sent from the host to the storage device, one or more virtual initiators (VIs) for mirroring the intercepted data to both the storage device and the appliance, wherein the DVT has an identifier for use by the host for writing and reading data with respect to the DVT, which such data are then handled by the one or more VIs so as to write and read such data with respect to the storage device or appliance or both;
the network device receiving a request at the CVT to modify operation of the data tapping mechanism; and
the network device modifying the data tapping mechanism based on the request.

2. The method as recited in claim 1, wherein the request is:
(i) a Read Only Redirect Request and the data tapping mechanism is modified so as to redirect a READ command to the appliance when the host is sending a READ command to the storage device so that the READ command is not sent to the storage device,
(ii) a READ and WRITE Redirect Request and the data tapping mechanism is modified so as to redirect a READ command to the appliance when the host is sending the READ command to the storage device so that the READ command is not sent to the storage device and for redirecting a WRITE command to the appliance when the host is sending the WRITE command to the storage device so that the WRITE command is not sent to the storage device,
an Undo Redirect Request and the data tapping mechanism is modified so as to resume sending a READ command to the storage device when the host is sending the READ command to the storage device and mirror a WRITE command to both the storage device and appliance when the host is sending the WRITE command to the storage device, or
a Quiesce Request and the data tapping mechanism is modified so as to suspend the SAN data from being sent to the appliance and the storage device, as well as any subsequent handshaking data from being sent between the host and the storage device.

3. The method as recited in claim 1, wherein the identifier of the DVT comprises a new world wide name (WWN) and a new fibre channel network identifier (FCID) that differ from a WWN and FCID, respectively, of the storage device, wherein the new WWN and the new FCID of the DVT are configured in or obtained by the host, wherein the one or more VIs have one or more FCIDs that differ from the new FCID of the DVT.

4. The method as recited in claim 1, wherein the identifier of the DVT comprises a same world wide name (WWN) as a WWN of the storage device and a new fibre channel network identifier (FCID) that differs from an FCID of the storage device, wherein the new FCID is obtained by the host based on the WWN of the DVT, wherein the one or more VIs comprise a first VI having a first FCID for writing to the storage device and a second VI having a second FCID for writing to the appliance, wherein the first and second FCIDs of the first and second VIs differ from the FCID of the DVT, wherein the first VI has a different WWN than a WWN of the second VI.

5. The method as recited in claim 4, wherein the appliance is in a different VSAN than a VSAN of the storage device, and wherein the first VI is in a different VSAN than a VSAN of the second VI, and wherein the first and second FCIDs of the first and second VIs differ from each other.

6. The method as recited in claim 5, wherein the identifier of the DVT comprises a same world wide name (WWN) as a WWN of the storage device and a same fibre channel network identifier (FCID) as an FCID of the storage device.

7. The method as recited in claim 1, wherein the request is a Stop Request and the data tapping mechanism is modified so as to stop the SAN data from being sent to the appliance.

8. The method as recited in claim 7, further comprising:
receiving a Start Request; and
modifying the data tapping mechanism so as to start the sending of the SAN data to the appliance.

9. The method as recited in claim 8, further comprising logging any WRITE data sent by the host to the storage device as WRITE errors for the appliance; and sending the logged WRITE errors to the appliance when the appliance requests the logged WRITE errors.

10. An apparatus for modifying a data tapping process in a storage area network (SAN), comprising:
one or more processors;
one or more memory, wherein at least one of the processors and memory are adapted for:
providing a data tapping mechanism for an appliance to receive SAN data that is being sent from a host to a storage device, wherein the appliance and the storage device are both physical devices and providing the data tapping mechanism includes creating a control virtual target (CVT) for receiving requests from the appliance to modify the tapping mechanism for the appliance, a data virtual target (DVT) for intercepting data sent from the host to the storage device, one or more virtual initiators (VIs) for mirroring the intercepted data to both the storage device and the appliance, wherein the DVT has an identifier for use by the host for writing and reading data with respect to the DVT, which such data are then handled by the one or more VIs so as to write and read such data with respect to the storage device or appliance or both;
receiving a request at the CVT to modify operation of the data tapping mechanism; and
modifying the data tapping mechanism based on the request.

11. The apparatus as recited in claim 10, wherein the request is:
(i) a Read Only Redirect Request and the data tapping mechanism is modified so as to redirect a READ command to the appliance when the host is sending a READ command to the storage device so that the READ command is not sent to the storage device,
(ii) a READ and WRITE Redirect Request and the data tapping mechanism is modified so as to redirect a READ command to the appliance when the host is sending the READ command to the storage device so that the READ command is not sent to the storage device and for redirecting a WRITE command to the appliance when the host is sending the WRITE command to the storage device so that the WRITE command is not sent to the storage device,
an Undo Redirect Request and the data tapping mechanism is modified so as to resume sending a READ command to the storage device when the host is sending the READ command to the storage device and mirror a WRITE command to both the storage device and appliance when the host is sending the WRITE command to the storage device, or
a Quiesce Request and the data tapping mechanism is modified so as to suspend the SAN data from being sent to the appliance and the storage device, as well as any subsequent handshaking data from being sent between the host and the storage device.

12. The apparatus as recited in claim 10, wherein the identifier of the DVT comprises a new world wide name (WWN) and a new fibre channel network identifier (FCID) that differ from a WWN and FCID, respectively, of the storage device, wherein the new WWN and the new FCID of the DVT are configured in or obtained by the host, wherein the one or more VIs have one or more FCIDs that differ from the new FCID of the DVT.

13. The apparatus as recited in claim 10, wherein the identifier of the DVT comprises a same world wide name (WWN) as a WWN of the storage device and a new fibre channel network identifier (FCID) that differs from an FCID of the storage device, wherein the new FCID is obtained by the host based on the WWN of the DVT, wherein the one or more VIs comprise a first VI having a first FCID for writing to the storage device and a second VI having a second FCID for writing to the appliance, wherein the first and second FCIDs of the first and second VIs differ from the FCID of the DVT, wherein the first VI has a different WWN than a WWN of the second VI.

14. The apparatus as recited in claim 13, wherein the appliance is in a different VSAN than a VSAN of the storage device, and wherein the first VI is in a different VSAN than a VSAN of the second VI, and wherein the first and second FCIDs of the first and second VIs differ from each other.

15. The apparatus as recited in claim 14, wherein the identifier of the DVT comprises a same world wide name (WWN) as a WWN of the storage device and a same fibre channel network identifier (FCID) as an FCID of the storage device.

16. The apparatus as recited in claim 10, wherein the request is a Stop Request and the data tapping mechanism is modified so as to stop the SAN data from being sent to the appliance.

17. The apparatus as recited in claim 16, wherein at least one of the processors and memory are further adapted for:
receiving an Start Request; and
modifying the data tapping mechanism so as to start the sending of the SAN data to the appliance.

18. An apparatus as recited in claim 17, wherein at least one of the processors and memory are further adapted for logging any WRITE data sent by the host to the storage device as WRITE errors for the appliance; and sending the logged WRITE errors to the appliance when the appliance requests the logged WRITE errors.

19. An apparatus for modifying a data tapping process in a storage area network (SAN), comprising:
means for providing a data tapping mechanism for an appliance to receive SAN data that is being sent from a host to a storage device, wherein the appliance and the storage device are both physical devices and the data tapping mechanism is provided by creating a control virtual target (CVT) for receiving requests from the appliance to modify the tapping mechanismfor the appliance, a data virtual target (DVT) for intercepting data sent from the host to the storage device, one or more virtual initiators (VIs) for mirroring the intercepted data to both the storage device and the appliance, wherein the DVT has an identifier for use by the host for writing and reading data with respect to the DVT, which such data are then handled by the one or more VIs so as to write and read such data with respect to the storage device or appliance or both;
means for receiving a request at the CVT to modify operation of the data tapping mechanism; and means for modifying the data tapping mechanism based on the request.

20. A system for modifying a data tapping process in a storage area network (SAN), comprising:
  a host;
  a storage device for storing data;
  an appliance for tapping data in the SAN;
  a network device in the SAN operable to:
    provide a data tapping mechanism for an appliance to receive SAN data that is being sent from a host to a storage device, wherein the appliance and the storage device are both physical devices and the data tapping mechanism is provided by creating a control virtual target (CVT) for receiving requests from the appliance to modify the tapping mechanism for the appliance, a data virtual target (DVT) for intercepting data sent from the host to the storage device, one or more virtual initiators (VIs) for mirroring the intercepted data to both the storage device and the appliance, wherein the DVT has an identifier for use by the host for writing and reading data with respect to the DVT, which such data are then handled by the one or more VIs so as to write and read such data with respect to the storage device or appliance or both;
    receive a request at the CVT to modify operation of the data tapping mechanism; and modify the data tapping mechanism based on the request.

* * * * *